United States Patent
Ramasubramonian et al.

(10) Patent No.: US 9,584,825 B2
(45) Date of Patent: Feb. 28, 2017

(54) LONG-TERM REFERENCE PICTURE SIGNALING IN VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 13/946,730

(22) Filed: Jul. 19, 2013

(65) Prior Publication Data

US 2014/0086324 A1  Mar. 27, 2014

Related U.S. Application Data

(60) Provisional application No. 61/706,510, filed on Sep. 27, 2012, provisional application No. 61/708,442, filed on Oct. 1, 2012.

(51) Int. Cl.
*H04N 19/58* (2014.01)
*H04N 19/70* (2014.01)

(52) U.S. Cl.
CPC ............ *H04N 19/58* (2014.11); *H04N 19/70* (2014.11)

(58) Field of Classification Search
CPC ...................................................... H04N 19/58
See application file for complete search history.

(56) References Cited

U.S. PATENT DOCUMENTS

| | | | |
|---|---|---|---|
| 2010/0189173 A1 | 7/2010 | Chen et al. | |
| 2011/0268192 A1 | 11/2011 | Moriyoshi | |
| 2012/0269275 A1 | 10/2012 | Hannuksela | |
| 2013/0272398 A1* | 10/2013 | Deshpande | H04N 19/00533 375/240.12 |
| 2013/0329787 A1* | 12/2013 | Ramasubramonian | H04N 19/70 375/240.12 |
| 2014/0003506 A1* | 1/2014 | Wang | H04N 19/70 375/240.12 |
| 2014/0286416 A1* | 9/2014 | Jeon | H04N 19/593 375/240.12 |

(Continued)

FOREIGN PATENT DOCUMENTS

WO    2013002700 A1    1/2013

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — James Pontius
(74) *Attorney, Agent, or Firm* — Shumaker & Sieffert, P.A.

(57) ABSTRACT

A video encoder signals, in a slice header for a current slice of a current picture, a first long-term reference picture (LTRP) entry, the first LTRP entry indicating that a particular reference picture is in a long-term reference picture set of the current picture. Furthermore, the video encoder signals, in the slice header, a second LTRP entry only if second LTRP entry does not indicate that the particular reference picture is in the long-term reference picture set of the current picture.

54 Claims, 5 Drawing Sheets

(56) References Cited

U.S. PATENT DOCUMENTS

2015/0304671 A1* 10/2015 Deshpande .......... H04N 19/423
375/240.12

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Deshpande, et al., "AHG21: Comments on Signaling of reference picture," JCT-VC Meeting; MPEG Meeting; Feb. 2-10, 2012; San Jose; (Joint Collaborative Team on Video Coding of ISO/IEC JTCI/SC29/WG11 and ITU-T SG.16); URL: http://wftp3.itu.int/av-arch/jctvc-site/, No. JCTVC-H0531, XP030111558, 5 pp.

International Preliminary Report on Patentability from International Application No. PCT/US2013/060416, dated Jan. 19, 2015, 10 pp.

International Search Report and Written Opinion from International Application No. PCT/US2012/060416, dated Nov. 25, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Ramasubramonian, et al., AHG13: Signalling of long-term reference pictures in the slice header, JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0115, XP030112477, 11 pp.

Ramasubramonian, et al., "AHG13: Signalling of long-term reference pictures in the SPS", JCT-VC Meeting; 101. MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/, No. JCTVC-J0116, XP030112478, 13 pp.

Ramasubramonian, et al., "AHG9: Reference picture set clean-ups", MPEG Meeting; ; Shanghai; (Motion Picture Expert Group or ISO/IEC JTC1/SC29/WG11), No. m26415, Oct. 16, 2012, XP030054748, 6 pp.

Sjoberg, et al., "Overview of HEVC High-Level Syntax and Reference Picture Management," IEEE Transactions on Circuits and Systems for Video Technology, vol. 22 (12), XP011487804, Dec. 2012, pp. 1858-1870.

Wahadaniah, et al., "AHG21: Construction and modification of predefined reference picture sets and reference picture lists", JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G548, Nov. 8, 2011, XP030110532, 21 pp.

Wang, et al., "AHG15: On reference picture set derivation and LTRP signaling in Slice header," 9. JCT-VC Meeting; 100. MPEG Meeting; Geneva; ((Joint Collaborative Team on Video Coding of ISO/IEC JTCI/ SC29/WG11 and ITU-T SG.16); URL: http://wftp3.itu.int/av-arch/ jctvc-site/,, No. JCTVC-10342, Apr. 17, 2012, XP030112105, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion from International Application No. PCT/US2013/060416, dated Aug. 20, 2014, 9 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

* cited by examiner

LONG-TERM REFERENCE PICTURE SIGNALING IN VIDEO CODING

This application claims the benefit of U.S. Provisional Patent Application No. 61/706,510, filed Sep. 27, 2012, and U.S. Provisional Patent Application No. 61/708,442, filed Oct. 1, 2012, the entire content of each of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes signaling of long-term reference pictures (LTRPs) in video coding. A video encoder signals, in a slice header for a current slice of a current picture, a first LTRP entry. The first LTRP entry indicates that a particular reference picture is an LTRP of the current picture. Furthermore, the video encoder signals, in the slice header, a second LTRP entry only if the second LTRP entry does not indicate that the particular reference picture is a long-term reference picture of the current picture. Similarly, a video decoder may decode the slice header and may generate, based at least in part on one or more LTRP entries signaled in the slice headers, a reference picture list for the current picture. The video decoder may reconstruct, based at least in part on one or more reference pictures in the reference picture list for the current picture, the current picture.

In one example, this disclosure describes a method of decoding video data, the method comprising: obtaining, from a bitstream, a slice header of a current slice of a current picture, wherein a set of one or more LTRP entries are signaled in the slice header, wherein the set of one or more LTRP entries includes a first LTRP entry indicating that a particular reference picture is in a long-term reference picture set of the current picture, and wherein the set of one or more LTRP entries includes a second LTRP entry only if the second LTRP entry does not indicate that the particular reference picture is in the long-term reference picture set of the current picture; generating, based at least in part on the one or more LTRP entries, a reference picture list for the current picture; and reconstructing, based at least in part on one or more reference pictures in the reference picture list for the current picture, the current picture.

In another example, this disclosure describes a video decoding device comprising one or more processors configured to: obtain, from a bitstream, a slice header of a current slice of a current picture, wherein a set of one or more LTRP entries are signaled in the slice header, wherein the set of one or more LTRP entries includes a first LTRP entry indicating that a particular reference picture is in a long-term reference picture set of the current picture, and wherein the set of one or more LTRP entries includes a second LTRP entry only if the second LTRP entry does not indicate that the particular reference picture is in the long-term reference picture set of the current picture; generate, based at least in part on the one or more LTRP entries, a reference picture list for the current picture; and reconstruct, based at least in part on one or more reference pictures in the reference picture list for the current picture, the current picture.

In another example, this disclosure describes a video decoding device comprising: means for obtaining, from a bitstream, a slice header of a current slice of a current picture, wherein a set of one or more LTRP entries are signaled in the slice header, wherein the set of one or more LTRP entries includes a first LTRP entry indicating that a particular reference picture is in a long-term reference picture set of the current picture, and wherein the set of one or more LTRP entries includes a second LTRP entry only if the second LTRP entry does not indicate that the particular reference picture is in the long-term reference picture set of the current picture; means for generating, based at least in part on the one or more LTRP entries, a reference picture list for the current picture; and means for reconstructing, based at least in part on one or more reference pictures in the reference picture list for the current picture, the current picture.

In another example, this disclosure describes a computer-readable storage medium having instructions stored thereon that, when executed by a video decoding device, configure the video decoding device to: obtain, from a bitstream, a slice header of a current slice of a current picture, wherein a set of one or more LTRP entries are signaled in the slice header, wherein the set of one or more LTRP entries includes a first LTRP entry indicating that a particular reference picture is in a long-term reference picture set of the current picture, and wherein the set of one or more LTRP entries includes a second LTRP entry only if the second LTRP entry does not indicate that the particular reference picture is in the long-term reference picture set of the current picture; generate, based at least in part on the one or more LTRP entries, a reference picture list for the current picture; and reconstruct, based at least in part on one or more reference pictures in the reference picture list for the current picture, the current picture.

In another example, this disclosure describes a method of encoding video data, the method comprising: signaling, in a slice header for a current slice of a current picture, a first LTRP entry, the first LTRP entry indicating that a particular reference picture is in a long-term reference picture set of the current picture; and signaling, in the slice header, a second LTRP entry only if the second LTRP entry does not indicate that the particular reference picture is in the long-term reference picture set of the current picture.

In another example, this disclosure describes a video encoding device comprising one or more processors configured to: signal, in a slice header for a current slice of a current picture, a first LTRP entry, the first LTRP entry indicating that a particular reference picture is in a long-term reference picture set of the current picture; and signal, in the slice header, a second LTRP entry only if the second LTRP entry does not indicate that the particular reference picture is in the long-term reference picture set of the current picture.

In another example, this disclosure describes a video encoding device comprising: means for signaling, in a slice header for a current slice of a current picture, a first LTRP entry, the first LTRP entry indicating that a particular reference picture is in a long-term reference picture set of the current picture; and means for signaling, in the slice header, a second LTRP entry only if the second LTRP entry does not indicate that the particular reference picture is in the long-term reference picture set of the current picture.

A computer-readable storage medium having instructions stored thereon that, when executed by a video encoding device, configure the video encoding device to: signal, in a slice header for a current slice of a current picture, a first LTRP entry, the first LTRP entry indicating that a particular reference picture is in a long-term reference picture set of the current picture; and signal, in the slice header, a second LTRP entry only if the second LTRP entry does not indicate that the particular reference picture is in the long-term reference picture set of the current picture.

The details of one or more examples of the disclosure are set forth in the accompanying drawings and the description below. Other features, objects, and advantages will be apparent from the description, drawings, and claims.

DETAILED DESCRIPTION

Figure 1:
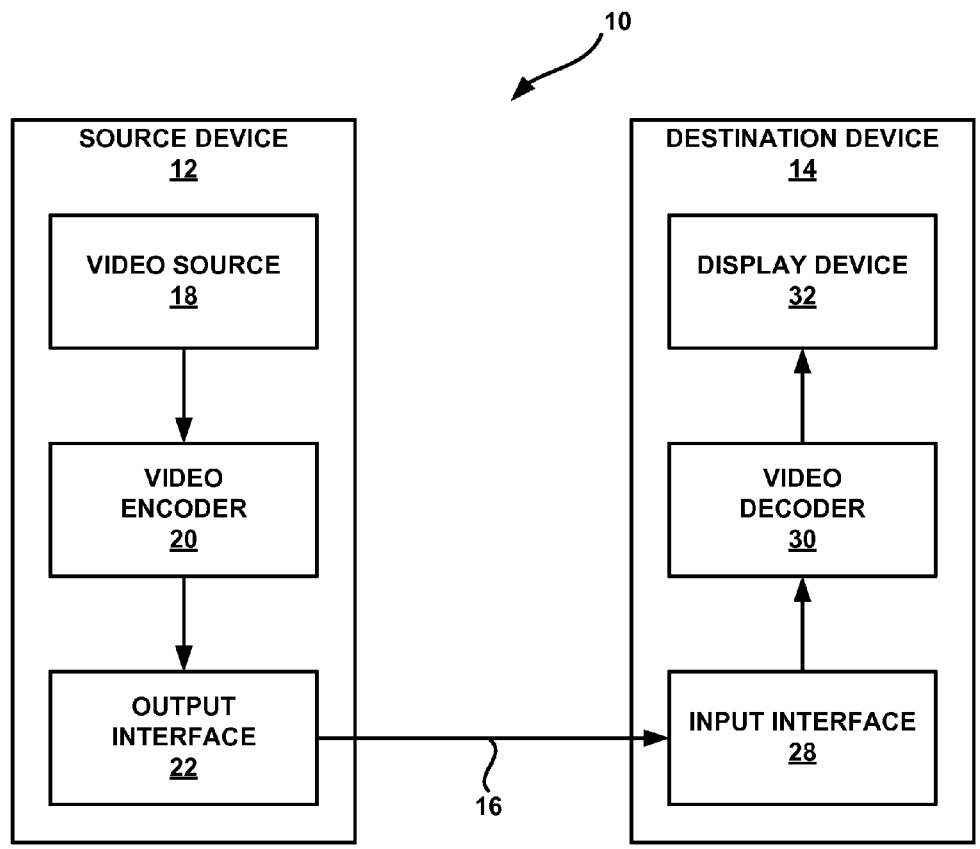
FIG. 1 is a block diagram illustrating an example video coding system that may utilize the techniques described in this disclosure.

A video encoder may generate a bitstream that includes encoded video data. Each picture of the video data may include an array of luma samples and may also include two corresponding arrays of chroma samples, e.g., arranged in blocks. To encode a picture of the video data, the video encoder may generate a plurality of coding tree units (CTUs) for the picture. Each of the CTUs may be associated with a different equally-sized block of luma samples within the picture and may also be associated with the corresponding blocks of chroma samples. The video encoder may generate one or more coding units (CUs) for each CTU. Each of the CUs of a CTU may be associated with a luma block within the luma block of the CTU and may also be associated with the two corresponding chroma blocks within the chroma blocks of the CTU.

Furthermore, the video encoder may generate one or more prediction units (PUs) for each CU. The video encoder may generate luma and chroma predictive blocks for each PU of the CU. The video encoder may use intra prediction or inter prediction to generate the predictive blocks for a PU. After the video encoder generates predictive blocks for one or more PUs of a CU, the video encoder may generate luma and chroma residual blocks associated with the CU. The luma and chroma residual blocks of the CU may indicate differences between samples in the luma and chroma predicted blocks for the PUs of the CU and the original luma and chroma blocks of the CU, respectively. The video encoder may partition the residual blocks of a CU into transform blocks. Furthermore, the video encoder may apply one or more transforms to each transform block to generate transform coefficient blocks. The video encoder may quantize the transform coefficient blocks and may apply entropy coding to syntax elements that represent transform coefficients of the transform coefficient block. The video encoder may output a bitstream that includes the entropy-encoded syntax elements.

When the video encoder begins encoding a current picture of the video data, the video encoder may determine a reference picture set (RPS) for the current picture. The RPS for the current picture may have five subsets (i.e., reference picture subsets). These five reference picture subsets are: RefPicSetStCurrBefore, RefPicSetStCurrAfter, RefPicSetStFoll, RefPicSetLtCurr, and RefPicSetLtFoll. The reference pictures in RefPicSetStCurrBefore, RefPicSetStCurrAfter, RefPicSetStFoll are referred to as "short-term reference pictures" or "STRPs." The reference pictures in RefPicSetLtCurr and RefPicSetLtFoll are referred to as "long-term reference pictures" or "LTRPs." In some instances, LTRPs may remain available for use in inter prediction for longer periods of time than STRPs. The video encoder may re-generate the five reference picture subsets for each picture of the video data.

Furthermore, when a current slice of the current picture is a P slice, the video encoder may use the reference pictures from the RefPicStCurrAfter, RefPicStCurrBefore, and Ref- PicStLtCurr reference picture subsets of the current picture to generate a single reference picture list, RefPicList0, for the current slice. When the current slice is a B slice, the video encoder may use the reference pictures from the RefPicStCurrAfter, RefPicStCurrBefore, and RefPicStLt-Curr reference picture subsets of the current picture to generate two reference picture lists, RefPicList0 and RefPicList1, for the current slice. When the video encoder uses inter prediction to generate the predictive block of a PU of the current picture, the video encoder may generate the predictive blocks of the PU based on samples within one or more reference pictures in one or more of the reference picture lists for the current slice.

The video encoder may signal a set of LTRP entries in a sequence parameter set (SPS). In other words, the SPS may explicitly indicate a set of LTRP entries. Each of the LTRP entries may indicate a reference picture as being in a long-term reference picture set (either in RefPicStLtCurr or RefPicStLtFoll) for the current picture. Furthermore, the video encoder may signal, in a slice header of the first (in coding order) slice of a current picture, indexes to LTRP entries indicated in the SPS applicable to the current picture. In this way, the slice header may "implicitly" signal LTRP entries or "index to" LTRP entries. In addition, the video encoder may signal, in the slice header of the first slice of the current picture, an additional set of LTRP entries. In other words, the slice header may explicitly signal additional LTRP entries.

For each respective LTRP entry explicitly indicated in the SPS, the video encoder may signal whether a reference picture indicated by the respective LTRP entry is used by a current picture. The reference pictures indicated by LTRP entries explicitly signaled in the SPS that are used by a current picture may be referred to herein as current LTRPs of the SPS. The reference pictures indicated by LTRP entries explicitly signaled in the SPS that are not used by a current picture may be referred to herein as non-current LTRPs of the SPS. Similarly, for each respective LTRP entry implicitly and explicitly signaled in the slice header, the slice header may indicate whether a reference picture indicated by the respective LTRP entry is used by the current picture. The reference pictures indicated by LTRP entries implicitly and explicitly signaled in the slice header that are used by the current picture may be referred to herein as current LTRPs of the slice header. The reference pictures indicated by LTRP entries implicitly and explicitly signaled in the slice header that are not used by the current picture may be referred to herein as non-current LTRPs of the slice header.

The RefPicStLtCurr reference picture subset for a current picture may include the current LTRPs of the first slice header of the current picture and the current LTRPs of an SPS applicable to the current picture. The RefPicStLtFoll reference picture subset of the current picture may include the non-current LTRPs of the SPS applicable to the current picture and the non-current LTRPs of the first slice header of the current picture.

The above-described signaling scheme may have several drawbacks. For example, the video encoder may potentially generate a slice header that explicitly signals an LTRP entry that indicates a reference picture and also implicitly signals an LTRP entry that indicates the same reference picture. Thus, the RefPicStLtCurr and/or the RefPicStLtFoll of the current picture may potentially include the same reference picture twice. In another example drawback of the above-described signaling scheme, the slice header itself may explicitly signal the same LTRP entry multiple times. Similarly, an SPS may explicitly signal the same LTRP entry multiple times. Explicitly signaling the same LTRP entry multiple times in either an SPS or a slice header may reduce coding efficiency. In another example drawback of the above-described signaling scheme, the SPS may include an LTRP entry that indicates that a particular reference picture is not used for reference by the current picture and concurrently a slice header (or the SPS) may include an LTRP entry that indicates that the particular LTRP is used for reference by the current picture, or vice versa. This confusion between whether the particular reference picture is used for reference by the current picture may cause decoding problems for a video decoder.

In accordance with the techniques of this disclosure, the video encoder may be restricted from signaling (either explicitly or implicitly) in the slice header multiple LTRP entries that indicate that the same reference picture is in a long-term reference picture set of the current picture. Rather, the video encoder is configured such that the slice header is in compliance with a restriction that prohibits the slice header from signaling two LTRP entries that indicate the same reference picture. Because the video encoder is restricted from signaling multiple LTRP entries that indicate the same reference picture, the LTRP entries cannot include contradictory syntax elements regarding whether the reference picture is used for reference by the current picture. Furthermore, in accordance with the techniques of this disclosure, the video encoder may be restricted from generating a slice header that indicates the same LTRP entry multiple times. That is, the video encoder may be restricted from implicitly signaling the same LTRP entry multiple times, restricted from explicitly signaling the same LTRP entry multiple times, and restricted from implicitly and explicitly signaling the same LTRP entry. Hence, the video encoder may signal an LTRP entry at most once, either implicitly or explicitly. These restrictions may potentially increase coding efficiency because the video encoder may not be able to include syntax elements in the SPS or the slice header for explicitly and implicitly signaling the same LTRP entry.

Hence, a video decoder may decode a slice header of a current slice of a current picture. A set of one or more LTRP entries may be signaled in the slice header. The set of one or more LTRP entries may include a first LTRP entry indicating that a particular reference picture is in a long-term reference picture set of the current picture. The set of one or more LTRP entries may include a second LTRP entry only if the second LTRP entry does not indicate that the particular reference picture is in the long-term reference picture set of the current picture. The video decoder may generate, based at least in part on the one or more LTRP entries, a reference picture list for the current picture and may reconstruct, based at least in part on one or more reference pictures in the reference picture list for the current picture, the current picture.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any legal bitstream conforming to MVC-based 3DV always contains a sub-bitstream that is compliant to a MVC profile, e.g., stereo high profile. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 8" is described in Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10$^{th}$ Meeting, Stockholm, Sweden, July 2012, which as of Jun. 20, 2013, is available from http://phenix.int-evey.fr/jct/doc_end_user/documents/10_Stockholm/wg11/JCTVC-J1003-v8.zip, the entire content of which is incorporated herein by reference.

In HEVC and other video coding specifications, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In instances where a picture is monochrome or where a picture is represented as three separate color planes, a CU may be a coding block of samples and syntax structures used to code the samples of the coding block. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Furthermore, video decoder 30 may perform inverse quantization and may apply an inverse transform to coefficient blocks to reconstruct transform blocks of a CU. Video encoder 20 may reconstruct, based at least in part on the reconstructed transform blocks of the CU and the predictive blocks of PUs of the CU, the coding blocks of the CU. A decoded picture buffer (DPB) of video encoder 20 may store the reconstructed coding blocks of the CUs of multiple pictures. Video encoder 20 may use the pictures stored in the DPB (i.e., reference pictures) to perform inter prediction on PUs of other pictures.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a current picture, video decoder 30 may reconstruct the current picture. Video decoder 30 may store the reconstructed current picture in a DPB for use in inter prediction of PUs in other pictures.

A picture order count (POC) value is a value that identifies one or more pictures occurring at one time instance (i.e., in one access unit). In base HEVC, only one picture occurs in an access unit. In scalable, multi-view, or 3-dimensional video coding, multiple pictures may occur at one time instance and hence a POC value may identify multiple pictures, i.e., at different layers. Video encoder 20 and video decoder 30 may use POC values of pictures to identify the pictures (e.g., for use in inter prediction).

When video encoder 20 begins encoding a current picture of the video data, video encoder 20 may generate five lists of POC values: PocStCurrBefore, PocStCurrAfter, PocStFoll, PocLtCurr, and PocLtFoll. Video encoder 20 may use these five lists of POC values to generate five corresponding reference picture subsets for the current picture: RefPicSetStCurrBefore, RefPicSetStCurrAfter, RefPicSetStFoll, RefPicSetLtCurr, and RefPicSetLtFoll. For each POC value in a list of POC values (e.g., PocStCurrBefore, PocStCurrAfter, PocStFoll, PocLtCurr, and PocLtFoll), video encoder 20 may determine whether the DPB includes a reference picture that has the POC value and, if so, video encoder 20 includes the reference picture in the reference picture set corresponding to the list of POC values.

The reference pictures in RefPicSetStCurrBefore, RefPicSetStCurrAfter, RefPicSetStFoll are referred to as "short-term reference pictures" or "STRPs." The reference pictures in RefPicSetLtCurr and RefPicSetLtFoll are referred to as "long-term reference pictures" or "LTRPs." In some instances, LTRPs may remain available for use in inter prediction for longer periods of time than STRPs. Video encoder 20 may re-generate the five lists of POC values and the corresponding reference picture sets for each picture of the video data.

Furthermore, when a current slice of the current picture is a P slice, video encoder 20 may use the reference pictures from the RefPicStCurrAfter, RefPicStCurrBefore, and RefPicStLtCurr reference picture subsets of the current picture to generate a single reference picture list, RefPicList0, for the current slice. When the current slice is a B slice, video encoder 20 may use the reference pictures from the RefPicStCurrAfter, RefPicStCurrBefore, and RefPicStLtCurr reference picture subsets of the current picture to generate two reference picture lists, RefPicList0 and RefPicList1, for the current slice. When video encoder 20 uses inter prediction to generate the predictive block of a PU of the current picture, video encoder 20 may generate the predictive blocks of the PU based at least in part on one or more reference pictures in one or more of the reference picture lists for the current slice.

Video encoder 20 may signal a set of LTRP entries in a sequence parameter set (SPS). In other words, the SPS may explicitly signal a set of LTRP entries. Each of the LTRP entries may indicate a reference picture and may indicate whether the reference picture is used for reference by the current picture. Furthermore, video encoder 20 may signal, in a slice header of the first (in coding order) slice of a current picture, indexes to LTRP entries signaled in the SPS that are applicable to the current picture. In this way, the slice header may implicitly signal (i.e., index to) LTRP entries. In addition, video encoder 20 may signal, in the slice header of the first slice of the current picture, additional LTRP entries. In other words, the slice header may explicitly signal additional LTRP entries.

Table 1, below, shows the syntax of the portion, within an SPS, regarding LTRPs.

TABLE 1

SPS Syntax Related to LTRPs

```
...
    long_term_ref_pics_present_flag              u(1)
    if( long_term_ref_pics_present_flag ) {
        num_long_term_ref_pics_sps               ue(v)
        for( i = 0; i < num_long_term_ref_pics_sps; i++ ) {
            lt_ref_pic_poc_lsb_sps[ i ]          u(v)
            used_by_curr_pic_lt_sps_flag[ i ]    u(1)
        }
    }
...
```

In the example syntax of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

In Table 1, the syntax element long_term_ref_pics_present_flag indicates whether the SPS includes syntax elements that indicate a set of LTRPs. The syntax element num_long_term_ref_pics_sps indicates the number of LTRPs signaled in the SPS. The syntax element lt_ref_pic_poc_lsb_sps[i] indicates the least-significant bits (LSBs) of the POC value of an LTRP at position i in the set of LTRPs. In some examples, the SPS includes a syntax element (e.g., log 2_max_pic_order_cnt_lsb_minus4) that indicates the maximum POC value that can be represented using LSBs alone. In such examples, the maximum POC value that can be represented using LSBs alone (e.g., MaxPicOrderCntLsb) may be equal to:

$$MaxPicOrderCntLsb = 2^{(log\ 2\_max\_pic\_order\_cnt\_lsb\_minus4+4)}$$

In Table 1, above, the syntax element used_by_curr_pic_lt_sps_flag[i] indicates whether the LTRP entry at position i in the set of LTRP entries is used in the reference picture set of a current picture. An LTRP entry in the SPS may be defined as a tuple consisting of lt_ref_pic_poc_lsb_sps[i] and used_by_curr_pic_lt_sps_flag[i]. In other words, an LTRP entry may be a LSB syntax element and a usage syntax element, where the LSB syntax element indicates the LSBs of a POC value of a reference picture and the usage syntax element indicates whether the reference picture is used for reference by the current picture.

Table 2, below, shows the syntax of a portion of a slice header regarding LTRPs.

TABLE 2

Slice Header Syntax Related to LTRPs

```
...
    if( long_term_ref_pics_present_flag ) {
        if( num_long_term_ref_pics_sps > 0 )
            num_long_term_sps                    ue(v)
        num_long_term_pics                       ue(v)
        for( i = 0; i < num_long_term_sps +
             num_long_term_pics; i++ ) {
            if( i < num_long_term_sps )
```

TABLE 2-continued

Slice Header Syntax Related to LTRPs

```
            lt_idx_sps[ i ]                      u(v)
        else {
            poc_lsb_lt[ i ]                      u(v)
            used_by_curr_pic_lt_flag[ i ]        u(1)
        }
        delta_poc_msb_present_flag[ i ]          u(1)
        if( delta_poc_msb_present_flag[ i ] )
            delta_poc_msb_cycle_lt[ i ]          ue(v)
    }
}
...
```

In Table 2, the syntax element num_long_term_sps indicates the number of candidate LTRPs specified in the applicable SPS for the current picture. The syntax element num_long_term_pics indicates the number of LTRP entries specified in the slice header that are included in the LTRP set of the current picture. The syntax element lt_idx_sps[i] specifies an index into the LTRP entries specified by the applicable SPS for the current picture. The poc_lsb_lt[i] syntax element may specify the value of the least-significant bits of the POC value of the i-th LTRP in the LTRP set of the current picture. The used_by_curr_pic_lt_flag[i] syntax element may specify whether the i-th LTRP to be included in the LTRP set of the current picture is used for reference by the current picture.

The syntax element delta_poc_msb_present_flag[i] indicates whether the delta_poc_msb_cycle_lt[i] syntax element is present in the slice header. The delta_poc_msb_cycle_lt[i] syntax element is used to determine the value of the most-significant bits (MSBs) of the i-th LTRP in the LTRP set of the current picture. Typically, STRPs do not remain in the DPB for extended sequences of pictures. Accordingly, the LSBs of the POC values of the STRPs may be sufficient to distinguish different STRPs. In contrast, LTRPs may remain in the DPB for longer sequences of pictures. Accordingly, the full POC values (i.e., the MSBs and LSBs of POC values) of LTRP may be needed to distinguish different LTRPs in the DPB and to distinguish LTRPs from STRPs in the DPB.

Because the number of pictures between different LTRPs signaled in the slice header is relatively unlikely to be significantly greater than the number of different pictures that can be indicated using only the LSBs of POC values, the number of bits required to indicate the difference between MSBs of POC values of the different LTRPs is likely to be smaller than the number of bits required to explicitly indicate the MSBs of the POC values of the different LTRPs. Accordingly, the delta_poc_msb_cycle_lt syntax elements may indicate differences between MSBs of POC values of LTRPs. Furthermore, if there is no difference between the LSBs of the POC values of a first LTRP and a second LTRP, a delta_poc_msb_present_flag syntax element may indicate that the slice header includes a delta_poc_msb_cycle_lt syntax element for the second LTRP that represents the difference between the MSBs of the POC values of the first and the second LTRP. In other words, the delta_pos_msb_present_flag[i] syntax element may indicate that the delta_poc_msb_cycle_lt[i] syntax element indicates the difference of the MSBs or the i-th and the (i−1)-th LTRP when the LSBs of the POC value of the i-th LTRP are equal to the LSBs of the POC value of the (i−1)-th LTRP.

Thus, in the syntaxes of Tables 1 and 2, the signaling of LTRPs may involve signaling the LSBs of POC values of LTRPs in the SPS or the slice header, and signaling the MSB-cycle difference, in some cases, in the slice header.

An LTRP entry in the slice header may be defined as either the LSB and the flag signaled by the poc_lsb_lt[i] syntax element and the used_by_curr_pic_lt_flag[i] syntax element, or the LSB and the flag corresponding to the entry in the SPS indicated by the lt_idx_sps[i] syntax element. When an LTRP entry is signaled in a slice header using the lt_idx_sps[i] syntax element, this disclosure refers to the LTRP entry as being indexed in the slice header, and the corresponding entries are derived from the SPS. When an LTRP entry is signaled in a slice header using the poc_lsb_lt[i] syntax element and the used_by_curr_pic_lt_flag[i] syntax element, this disclosure refers to the LTRP entry as being explicitly signaled in the slice header.

For each respective LTRP entry explicitly signaled in the SPS, video encoder 20 may signal whether a reference picture indicated by the respective LTRP entry is used by a current picture. The RefPicStLtCurr reference picture subset for the current picture includes the reference pictures indicated by the LTRP entries signaled in the slice header that may be used for reference by the current picture. The RefPicStLtFoll reference picture subset of the current picture may include the reference pictures indicated by LTRP entries signaled in the slice header that are not used for reference by the current picture.

Video decoder 30 may obtain an SPS and a slice header from a bitstream. When video decoder 30 starts decoding a first slice of a current picture, video decoder 30 may determine that a particular SPS is applicable to the current picture. Furthermore, video decoder 30 may determine, based at least in part on syntax elements in the applicable SPS and/or syntax elements in the slice header, POC values to be included in PocStCurrBefore, PocStCurrAfter, PocStFoll, PocLtCurr, and PocLtFoll. Video decoder 30 may then use PocStCurrBefore, PocStCurrAfter, PocStFoll, PocLtCurr, and PocLtFoll to determine the reference picture subsets for the current picture: RefPicSetStCurrBefore, RefPicSetStCurrAfter, RefPicSetStFoll, RefPicSetLtCurr, and RefPicSetLtFoll. Subsequently, video decoder 30 may use RefPicStCurrBefore, RefPicSetStCurrAfter, and RefPicSetLtCurr to determine one or more reference picture lists (e.g., RefPicList0 and RefPicList1) for the current picture. As described above, video decoder 30 may use reference pictures in the reference picture lists for inter prediction of PUs.

The above-described signaling scheme has several drawbacks. In one example drawback of the above-described signaling scheme, the slice header itself may explicitly signal the same LTRP entry multiple times. In other words, there is no restriction in the above-described semantics that disallows the same LTRP entry to be signaled (explicitly or indexed) more than once in one slice header. In another example drawback of the above-described signaling scheme, the SPS may indicate that a particular LTRP is not used by the current picture and concurrently a slice header may indicate that the particular LTRP is used by the current picture, or vice versa. For instance, the slice header may explicitly signal and/or index to LTRP entries that indicate the same reference picture but have different values for the used_by_curr_pic_flag syntax element. Consequently, the above-described syntax and semantics allow for a slice header that signals LTRP entries that indicate that a particular reference picture is in both the RefPicSetLtCurr subset and the RefPicSetLtFoll subset. This confusion between whether the particular LTRP is used for reference by the current picture may cause decoding problems for video decoder 30.

Hence, in accordance with one or more techniques of this disclosure, restrictions may be added such that each LTRP that is signaled (explicitly or indexed) in a slice header must refer to a distinct reference picture among all the LTRPs that are signaled (explicitly or indexed) in the slice header. For instance, video encoder 20 is restricted from implicitly signaling (i.e., indexing to) multiple LTRP entries that indicate the same LTRP, restricted from explicitly signaling multiple LTRP entries that indicate the same LTRP multiple times, and restricted from implicitly and explicitly signaling LTRP entries that indicate the same LTRP.

Thus, video encoder 20 may signal, in a slice header for a current slice of a current picture, a first LTRP entry. The first LTRP entry may indicate that a particular reference picture is in a long-term reference picture set of the current picture. The long-term reference picture set of the current picture may include reference pictures in RefPicSetLtCurr and RefPicSetLtFoll. Furthermore, video encoder 20 may signal, in the slice header, a second LTRP entry only if the second LTRP entry does not indicate that the particular reference picture is in the long-term reference picture set of the current picture. In some examples, a bitstream may fail a bitstream conformance test if two LTRP entries signaled in a slice header in the bitstream indicate that the same reference picture is in the long-term reference picture set of the current picture.

In some examples, video encoder 20 may signal the first LTRP entry by including, in the slice header, an index to the first LTRP entry. In this example, video encoder 20 may signal the second LTRP entry by including, in the slice header, the second LTRP entry only if the second LTRP entry does not indicate that the particular reference picture is in the reference picture set of the current picture. For instance, video encoder 20 may generate the slice header such that the slice header is in compliance with a restriction that prohibits the slice header from explicitly including a particular LTRP entry if the slice header includes an index to an equivalent LTRP entry in the SPS. Thus, a bitstream may fail a bitstream conformance test if a slice header includes a particular LTRP and includes an index to an equivalent LTRP entry in the SPS. In this example, the particular LTRP entry includes an LSB syntax element and a usage syntax element. Furthermore, in this example, the equivalent LTRP entry includes a LSB syntax element that matches the LSB syntax element of the particular LTRP entry and the equivalent LTRP entry includes a usage syntax element that matches the usage syntax element of the particular LTRP. The LSB syntax element of the particular LTRP entry and the LSB syntax element of equivalent LTRP entry indicate LSBs of POC values. The usage syntax element of the particular LTRP entry and the usage syntax element of the equivalent LTRP entry indicate whether reference pictures may be used for reference by the current picture.

In another example, the set of LTRP entries in the SPS may include the first LTRP entry and the second LTRP entry. In this example, video encoder 20 may include, in the slice header, an index to the first LTRP and may include, in the slice header, an index to the second LTRP entry only if the second LTRP entry does not indicate that the particular reference picture is in the long-term reference picture set of the current picture.

In still another example, video encoder 20 may signal the first LTRP entry by including, in the slice header, the first LTRP entry. Furthermore, video encoder 20 may signal the second LTRP entry by including, in the slice header, the second LTRP entry. Thus, video encoder 20 may include, in the slice header, the first LTRP entry and may include, in the slice header, the second LTRP entry only if the second LTRP entry does not indicate that the particular reference picture is in the long-term reference picture set of the current picture. In this way, video encoder 20 may generate the slice header such that the slice header is in compliance with a restriction that prohibits the slice header from including two LTRP entries that indicate reference pictures having the same POC value. Thus, a bitstream may fail a bitstream conformance test if a slice header in the bitstream includes two LTRP entries that indicate reference pictures having the same POC value.

As indicated above, the long-term reference picture set of the current picture may include a first subset (e.g., RefPicStLtCurr) and a second subset (e.g., RefPicStLtFoll). The first subset may include LTRPs used for reference by the current picture and the second subset may include LTRPs used for reference by other pictures. In accordance with the techniques of this disclosure, video encoder 20 may generate the slice header such that the slice header is in compliance with a restriction that prohibits the first subset from including two reference pictures with the same POC value, a restriction that prohibits the second subset from including two reference pictures with the same POC value, and a restriction that prohibits the first and second subsets from including reference pictures with the same POC value. Thus, a bitstream may fail a bitstream conformance test if the first subset includes two reference pictures with the same POC value and/or if the second subset includes two reference pictures with the same POC value.

Furthermore, in some examples, for each respective LTRP entry in the set of one or more LTRP entries in the SPS, the slice header includes an index to the respective LTRP entry only if the slice header does not already include a copy of the index to the respective LTRP entry. In this way, video encoder 20 may generate the slice header in compliance with a restriction that prohibits the slice header from including two indexes to a single LTRP entry in the SPS. Thus, a bitstream may fail a bitstream conformance test if a slice header includes two indexes to a single LTRP entry in an SPS.

In another example drawback of the signaling scheme of HEVC Working Draft 8, an SPS may explicitly signal the same LTRP entry multiple times. Explicitly signaling the same LTRP entry multiple times in either an SPS or a slice header may reduce coding efficiency. In other words, there is no restriction in the above-described semantics for the same LTRP entry being signaled more than once in the SPS.

In accordance within one or more techniques of this disclosure, a restriction may be added that disallows duplicate LTRP entries among the LTRP entries signaled in an SPS. In other words, video encoder 20 is restricted from generating an SPS that explicitly signals the same LTRP entry multiple times. For example, video encoder 20 may generate an SPS such that the SPS includes a particular LTRP entry only if the SPS does not already include a copy of the particular LTRP entry. In this way, video encoder 20 may generate the SPS such that the SPS conforms to a restriction that prohibits the SPS from including two or more copies of the same LTRP entry. In some instances, a device (such as video encoder 20 or video decoder 30) may perform a bitstream conformance test to determine whether a bitstream is in conformance with a video coding standard, such as HEVC. A bitstream may fail to satisfy the bitstream conformance test if the SPS includes two or more copies of the same LTRP entry.

In another example drawback of the signaling scheme of HEVC Working Draft 8, video encoder 20 may potentially generate a slice header that explicitly indicates an LTRP entry and also implicitly indicates the same LTRP entry. Thus, the RefPicStLtCurr and/or the RefPicStLtFoll of the current picture may potentially include the same LTRP entry twice. In other words, LTRP entries may be signaled in the SPS and indexed (i.e., implicitly indicated) in the slice header. However, the above-described semantics may permit any LTRP entry signaled in the SPS to be also explicitly signaled in the slice header. Such flexibility may be unnecessary.

Hence, in accordance with one or more techniques of this disclosure, a restriction may be added such that an LTRP entry is not directly signaled in any slice header when an equivalent LTRP entry is included in the SPS. Thus, for each respective LTRP entry in the SPS, the slice header does not include a particular LTRP entry if the particular LTRP entry matches the respective LTRP entry in the SPS. For instance, a bitstream may fail a bitstream conformance test if the SPS includes two matching LTRP entries.

In another example drawback of the signaling scheme of HEVC Working Draft 8, the value of the delta_poc_msb_present_flag[i] syntax element conditions the signaling of the delta_poc_msb_cycle_lt[i] syntax element. In other words, the signaling of the delta_poc_msb_cycle_lt[i] syntax element depends on the value of delta_poc_msb_present_flag[i] syntax element. As explained above, the delta_poc_msb_present_flag[i] syntax element may indicate that the delta_poc_msb_cycle_lt[i] syntax element is not present if the MSBs of the POC value of the i-th LTRP are equal to the MSBs of the POC value of the (i−1)-th LTRP. The delta_poc_msb_cycle_lt[i] syntax element is Exponential-Golomb coded (i.e. ue(v) coded). However, the explicit signaling of the delta_poc_msb_present_flag[i] syntax element may not be necessary, and the delta_poc_msb_cycle_lt[i] syntax element may be modified to cover all the cases (i.e., both the case where MSBs of a POC value are signaled and where MSBs of a POC value are not signaled).

Hence, in accordance with one or more techniques of this disclosure, the delta_poc_msb_present_flag[i] syntax element is removed from the slice header syntax and the semantics of the delta_poc_msb_cycle_lt[i] syntax element are modified to cover all the possible cases. As described herein, the value of the delta_poc_msb_cycle_lt syntax element (or an equivalent syntax element) for the i-th LTRP for the current picture may be required to be greater than 0 when there are multiple reference pictures in the DPB, excluding those pictures that are signaled as STRPs for the current picture, with POC values modulo MaxPicOrderCntLsb equal to the LSBs of the POC value of the i-th LTRP, where MaxPicOrderCntLsb is the greatest value that can be represented using only the LSBs of a POC value.

In another example drawback of the signaling scheme of HEVC Working Draft 8, when there are two reference pictures in the DPB with the same LSBs, and one of the pictures is signaled as an STRP and the other picture as an LTRP, the semantics of HEVC Working Draft 8 mandate that the MSB information of the LTRP be signaled. However, in this case, the MSB information for the LTRP need not be signaled. Hence, in accordance with one or more techniques of this disclosure, the semantics and the derivation process of the reference picture set may be modified such that when there are n (where n>1) reference pictures in the DPB with POC values having the same LSBs, and (n−1) of those pictures are signaled as STRPs and the n-th picture is signaled as an LTRP, then the MSBs of the POC value of the LTRP are not allowed to be signaled.

In HEVC Working Draft 8, an SPS may include a plurality of short term reference picture set (STRPS) syntax structures (e.g., short_term_ref_pic_set syntax structures). A slice header may either include a STRPS syntax structure or include one or more syntax elements indicating one of the STRPS syntax structures in the applicable SPS. Sets of STRPs (i.e., RefPicSetStCurrBefore, RefPicSetStCurrAfter, and RefPicSetStFoll) for the current picture may be signaled in a STRPS syntax structure.

More specifically, the sets of STRPs for the current picture may be signaled in a STRPS syntax structure in one of two ways. In the first way, the STRPS syntax structure includes syntax elements that enable video decoder 30 to determine, based at least in part on syntax elements in a reference STRPS syntax structure in the applicable SPS, an array of DeltaPocS0 values and an array of DeltaPocS1 values. In the second way, the STRPS syntax structure includes syntax elements that enable video decoder 30 to determine the array of DeltaPocS0 values and the array of DeltaPocS1 values without reference to any other STRPS syntax structure. The array of DeltaPocS0 values indicates values to add to the POC value of the current picture to determine POC values in PocStCurrBefore and PocStFoll. The array of DeltaPocS1 values indicates values to subtract from the POC value of the current picture to determine POC values in PocStCurrAfter and PocStFoll. As indicated above, video decoder 30 may determine RefPicSetStCurrBefore based at least in part on PocStCurrBefore. Video decoder 30 may determine RefPicSetStCurrAfter based at least in part on PocStCurrAfter. Video decoder 30 may determine RefPicStFoll based at least in part on PocStFoll.

Another example drawback of the signaling scheme of HEVC Working Draft 8 is that it is possible to repeat the same STRPs in the list of STRPs, which should be disallowed. In other words, the SPS may include multiple identical STRPS syntax structures. It is also possible that a STRPS syntax structure explicitly signaled in the slice header is identical to a STRPS syntax structure signaled in the SPS, which should also be disallowed. Hence, one or more techniques of this disclosure may restrict video encoder 20 such that no two short-term reference picture set candidates (i.e., no two STRPS syntax structures) signaled in the SPS are identical. Furthermore, in accordance with one or more techniques of this disclosure, video encoder 20 is restricted from signaling a STRPS syntax structure in the slice header if an identical pattern (i.e., STRPS syntax structure) is signaled among the short-term RPS candidates (i.e., STRPS syntax structures) in the SPS. That is, a short-term reference picture set pattern (i.e., a STRPS syntax structure) cannot be explicitly signaled in the slice header if an identical candidate (i.e., an identical STRPS syntax structure) is present in the candidate list in the SPS.

Figure 2:
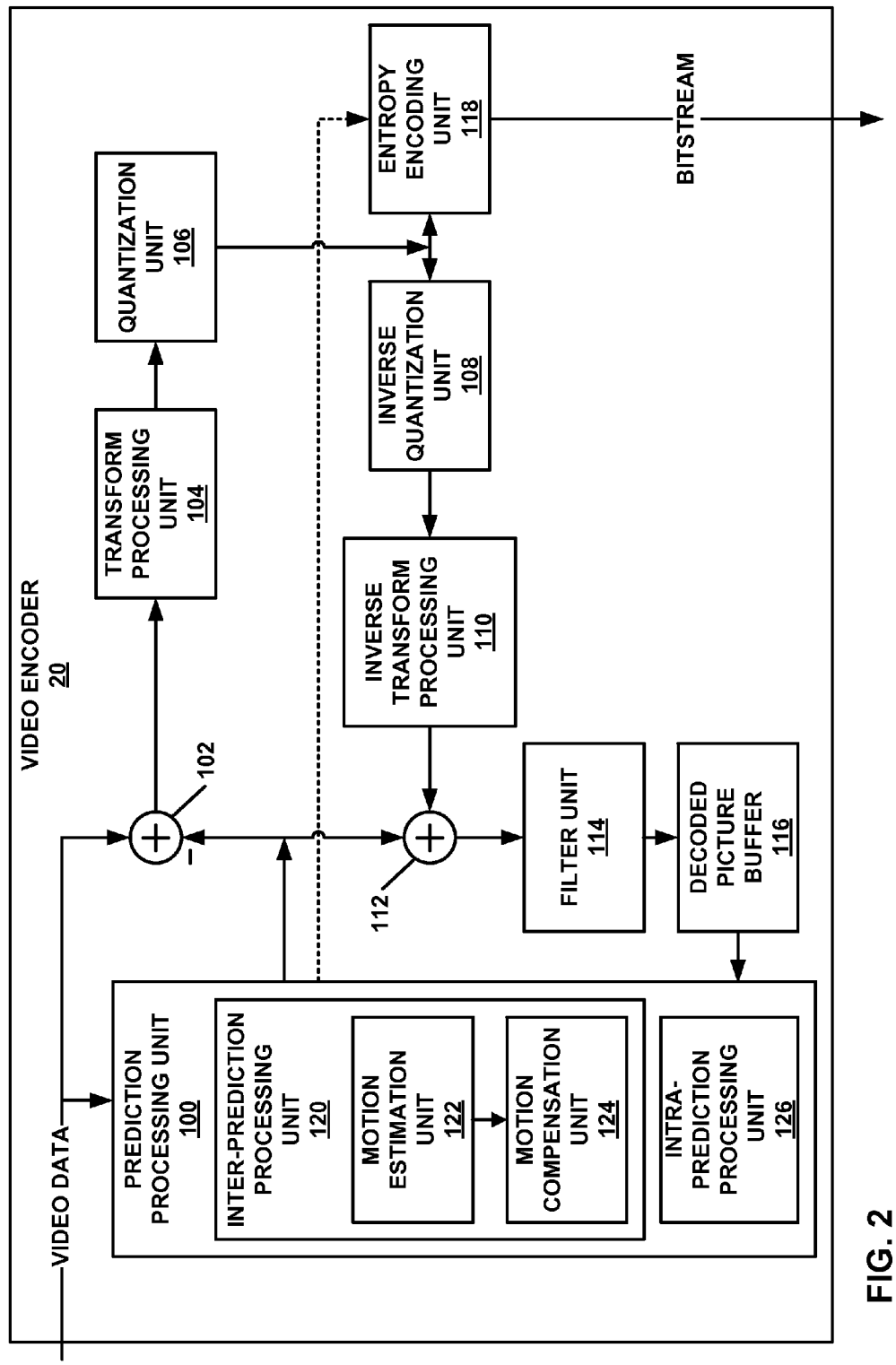
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

When video encoder 20 begins encoding a current picture, inter-prediction processing unit 120 may determine reference picture subsets for the current picture. Furthermore, inter-prediction processing unit 120 may determine, based at least in part on the reference picture subsets for the current picture, one or more reference picture lists for the current picture. Inter-prediction processing unit 120 may signal the reference picture subsets for the current picture using syntax elements in an SPS applicable to the current picture and one or more slice headers of one or more slices of the current picture.

In accordance with one or more techniques of this disclosure, inter-prediction processing unit 120 may generate a slice header for a current slice of the current picture such that the slice header does not signal (either explicitly or via indexing) two LTRP entries associated with the same reference picture. For example, inter-prediction processing unit 120 may signal, in the slice header, a first LTRP entry. In this example, the first LTRP entry may indicate that a particular reference picture is in a long-term reference picture set of the current picture. Furthermore, in this example, inter-prediction processing unit 120 may signal, in the slice header, a second LTRP entry only if the second LTRP entry does not indicate that the particular reference picture is in the long-term reference picture set of the current picture.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between reference locations associated with the reference regions and a prediction block of the PU. The motion information of the PU may include the reference indexes and the motion vectors of the PU. Motion compensation unit 124 may generate the predictive sample blocks of the PU based at least in part on actual or interpolated samples at the reference region indicated by the motion vectors of the PU.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from spatially-neighboring blocks to generate the predictive blocks of a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add samples of the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
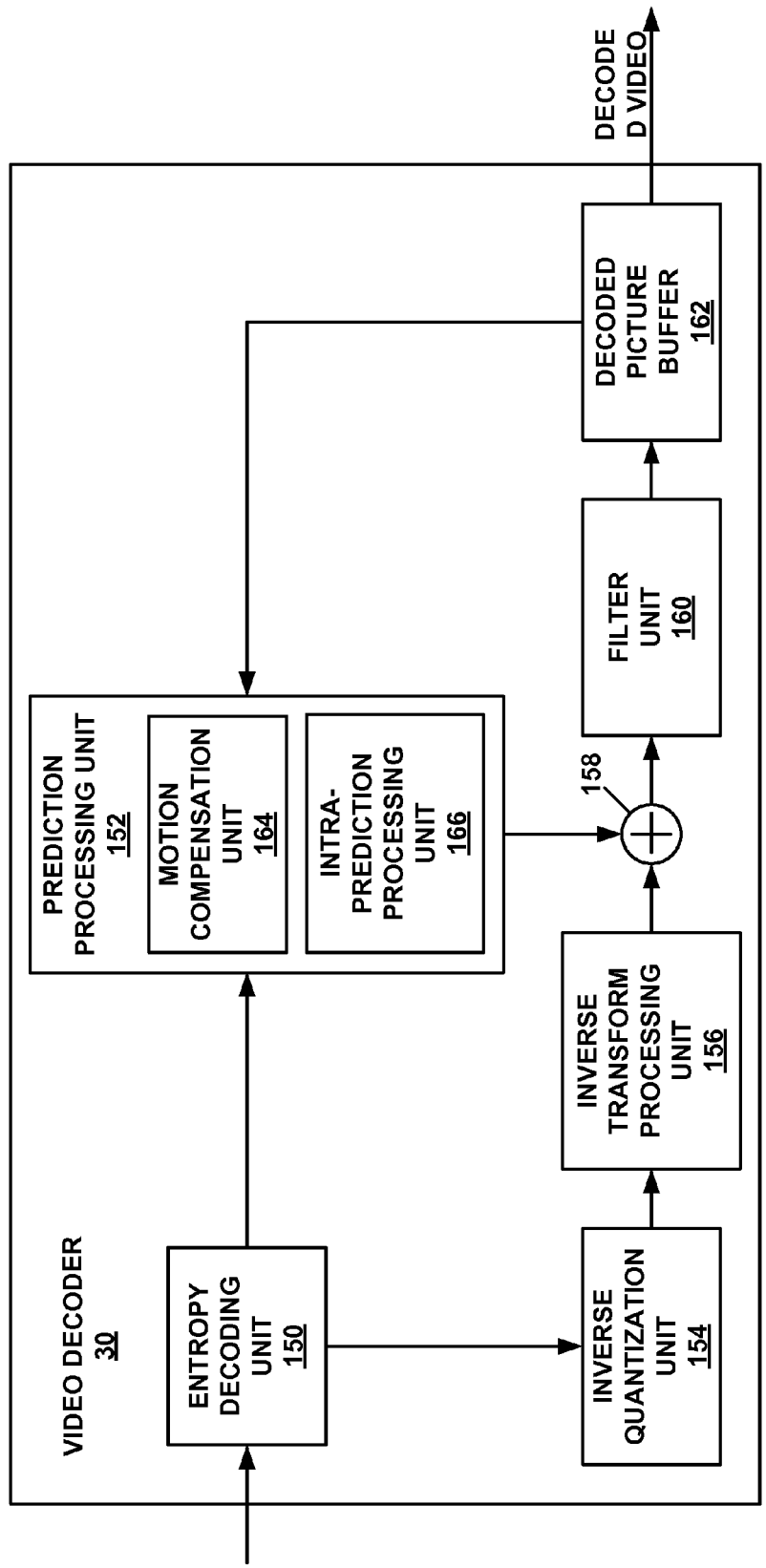
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods. The bitstream may also include syntax elements that are not entropy coded.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to obtain syntax elements from the bitstream. Entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data based on the syntax elements obtained from the bitstream.

The bitstream may comprise a series of NAL units. The NAL units of the bitstream may include coded slice NAL units. As part of decoding the bitstream, entropy decoding unit 150 may obtain and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with (i.e., applicable to) a picture that contains the slice.

In addition to obtaining syntax elements from the bitstream, video decoder 30 may perform a reconstruction operation on a CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed, if any.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements obtained from the bitstream.

When video decoder 30 begins decoding a current picture, prediction processing unit 152 may determine reference picture subsets for the current picture based on syntax elements in an SPS applicable to the current picture and syntax elements in a slice header of a slice of the current picture. The reference picture subsets for the current picture may include RefPicSetStCurrBefore, RefPicSetStCurrAfter, RefPicSetStFoll, RefPicSetLtCurr, and RefPicSetLtFoll.

One or more LTRP entries may be signaled in the slice header. The LTRP entries may be signaled in the slice header using indexes and/or explicitly signaled in the slice header. Each of the LTRP entries signaled in the slice header indicates a reference picture in a long-term reference picture subset of the current picture (e.g., RefPicSetLtCurr and RefPicSetLtFoll). In accordance with one or more techniques of this disclosure, two LTRP entries signaled in the slice header cannot indicate that the same reference picture is included in the long-term reference picture set of the current picture. For instance, when the set of one or more LTRP entries includes a first LTRP entry indicating that a particular reference picture is in a long-term reference picture set of the current picture, the set of one or more LTRP entries includes a second LTRP entry only if the second LTRP entry does not indicate that the particular reference picture is in the long-term reference picture set of the current picture.

Prediction processing unit 152 may construct a first reference picture list (RefPicList0) and a second reference picture list (RefPicList1) based at least in part on the reference pictures in decoded picture buffer 162 and the reference pictures in RefPicSetStCurrBefore, RefPicSetStCurrAfter, and RefPicSetLtCurr. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may obtain, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Figure 4:
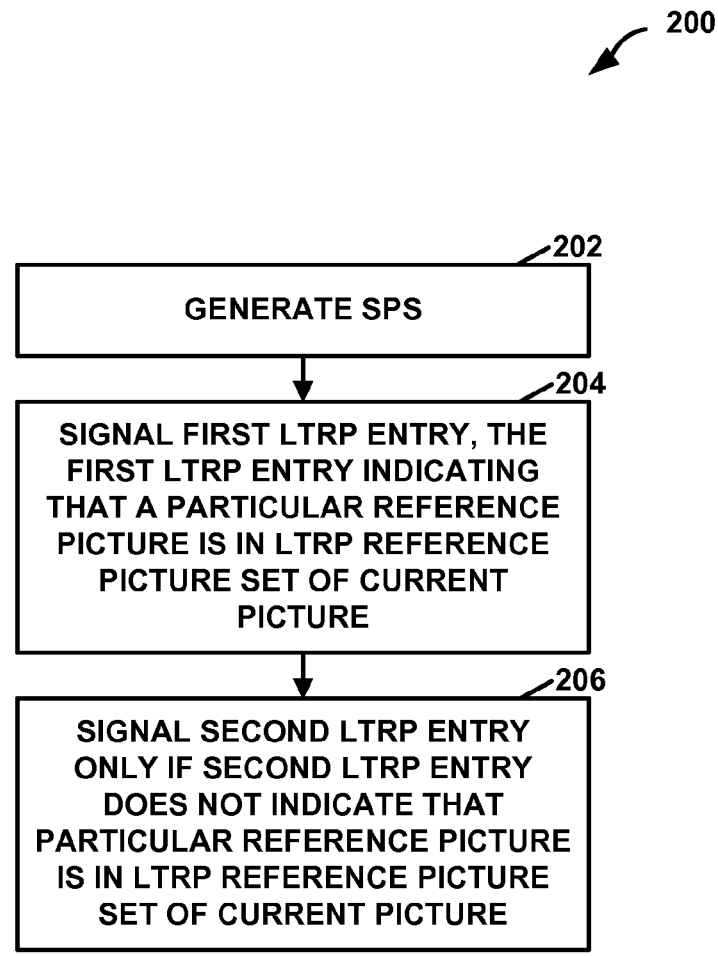
FIG. 4 is a flowchart illustrating an example operation of a video encoder, in accordance with one or more techniques of this disclosure.

FIG. 4 is a flowchart illustrating an example operation 200 of video encoder 20, in accordance with one or more techniques of this disclosure. As shown in the example of FIG. 4, video encoder 20 may generate an SPS (202). In addition, video encoder 20 may signal, in a slice header for a current slice of a current picture, a first LTRP entry (204). The first LTRP entry indicates that a particular reference picture is in a long-term reference picture set of the current picture. Furthermore, video encoder 20 may signal, in the slice header, a second LTRP entry only if second LTRP entry does not indicate that the particular reference picture is in the long-term reference picture set of the current picture (206).

In some examples, the SPS includes a set of one or more LTRP entries that includes the first LTRP entry. In some such examples, video encoder 20 generates the SPS such that the SPS includes the first LTRP entry only if the SPS does not already include a copy of the first LTRP entry. That is, video encoder 20 may generate the SPS such that the SPS conforms to a restriction that prohibits the SPS from including two or more copies of the same LTRP entry. For instance, a bitstream may fail to pass a bitstream conformance test if the SPS includes two or more copies of the same LTRP entry.

Figure 5:
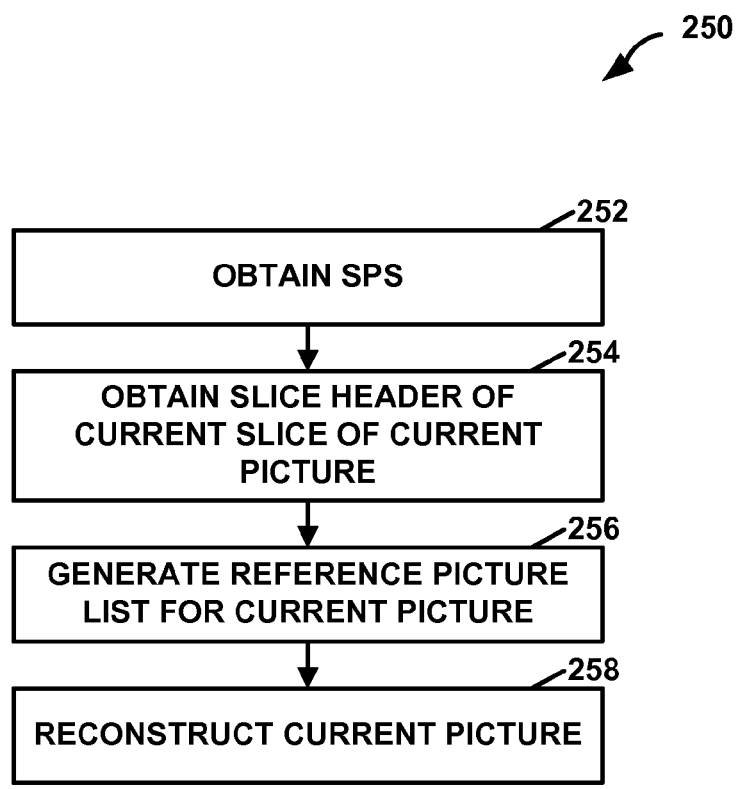
FIG. 5 is a flowchart illustrating an example operation of a video decoder, in accordance with one or more techniques of this disclosure.

FIG. 5 is a flowchart illustrating an example operation 250 of video decoder 30, in accordance with one or more techniques of this disclosure. As illustrated in the example of FIG. 5, video decoder 30 may obtain, from a bitstream, an SPS that is applicable to a current picture (252). In addition, video decoder 30 may obtain, from the bitstream, a slice header of a current slice of the current picture (254). A set of one or more LTRP entries are signaled in the slice header. The set of one or more LTRP entries may include a first LTRP entry indicating that a particular reference picture is in a long-term reference picture set of the current picture. Furthermore, the set of one or more LTRP entries may include a second LTRP entry only if the second LTRP entry does not indicate that the particular reference picture is in the long-term reference picture set of the current picture.

Video decoder 30 may generate, based at least in part on the one or more LTRP entries, a reference picture list for the current picture (256). In addition, video decoder 30 may reconstruct, based at least in part on one or more reference pictures in the reference picture list for the current picture, the current picture (258).

In some examples, the SPS may include the first LTRP entry and the slice header may include an index to the first LTRP entry. Furthermore, in some such examples, the slice header may include the second LTRP entry only if the second LTRP entry does not indicate that the particular reference picture is in the long-term reference picture set of the current picture. For example, the slice header may be in compliance with a restriction that prohibits the slice header from including a particular LTRP entry if the slice header includes an index to an equivalent LTRP entry in the SPS. Thus, a bitstream may fail to satisfy a bitstream conformance test if the slice header includes a particular LTRP entry and there is an equivalent LTRP entry in the SPS. In this example, the particular LTRP entry includes a LSB syntax element and a usage syntax element. Furthermore, in this example, the equivalent LTRP entry includes a LSB syntax element that matches the LSB syntax element of the particular LTRP entry and the equivalent LTRP entry includes a usage syntax element that matches the usage syntax element of the particular LTRP.

In other examples where the SPS includes the first LTRP entry, the SPS may also include the second LTRP entry and the slice header may include an index to the second LTRP entry only if the second LTRP entry does not indicate that the particular reference picture is in the long-term reference picture set of the current picture.

In some examples, the SPS may be in compliance with a restriction that prohibits the SPS from including two or more copies of the same LTRP entry. Thus, the SPS is prohibited from including two LTRP entries that have the same LSB syntax elements and usage flag syntax elements. Furthermore, the slice header may be in compliance with a restriction that prohibits the slice header from including two indexes to a single LTRP entry in the SPS. For example, if the SPS includes an LTRP entry associated with the index "2," the slice header cannot include the index value "2" more than once.

In other examples, the slice header may include the first LTRP entry. In such examples, the slice header may include the second LTRP entry only if the second LTRP entry does not indicate that the particular reference picture is in the long-term reference picture set of the current picture. Thus, the slice header may be in compliance with a restriction that prohibits the slice header from including two LTRP entries that indicate reference pictures having the same POC value.

The following section describes changes to HEVC Working Draft 8 that may implement one or more techniques of this disclosure. In the following section, text inserted into HEVC Working Draft 8 is shown below in underline and text removed from HEVC Working Draft 8 is shown below as italicized text enclosed in double square brackets. Other parts not mentioned below may be the same as in HEVC Working Draft 8.

In section 7.4.2.2 of HEVC Working Draft 8, the semantics for used_by_curr_pic_lt_sps_flag[i] are modified as follows:

used_by_curr_pic_lt_sps_flag[i] equal to 0 specifies that the i-th candidate long-term reference picture specified in the sequence parameter set is not used for reference by a picture that includes in its reference picture set the i-th candidate long-term reference picture specified in the sequence parameter set. For any i and j in the range of 0 to num_long_term_ref_pics_sps−1, inclusive, if i is not equal to j and lt_ref_pic_poc_lsb_sps[i] is equal to lt_ref_pic_poc_lsb_sps[j], then used_by_curr_pic_lt_sps_flag[i] shall not be equal to used_by_curr_pic_lt_sps_flag[j].

This modification to section 7.4.2.2 of HEVC Working Draft 8 may, in accordance with one or more techniques of this disclosure, implement the restriction that disallows a slice header from signaling (explicitly or indexed) duplicate LTRPs.

In section 7.3.5.1 of HEVC WD 8, the slice header syntax may be modified indicated in Table 3, below.

TABLE 3

Slice header syntax

| | |
|---|---|
| ... | |
| short_term_ref_pic_set_idx | u(v) |
| if( long_term_ref_pics_present_flag ) { | |
|   if( num_long_term_ref_pics_sps > 0 ) | |
|     num_long_term_sps | ue(v) |
|   num_long_term_pics | ue(v) |
|   for( i = 0; i < num_long_term_sps + num_long_term_pics; i++ ) { | |
|     if( i < num_long_term_sps ) | |
|       lt_idx_sps[ i ] | u(v) |
|     else { | |
|       poc_lsb_lt[ i ] | u(v) |
|       used_by_curr_pic_lt_flag[ i ] | u(1) |
|     } | |
|     [[delta_poc_msb_present_flag[ i ]]] | [[u(1)]] |
|     [[if( delta_poc_msb_present_flag[ i ] )]] | |
|     delta_poc_msb_cycle_lt_plus1[ i ] | ue(v) |
|   } | |
| } | |
| ... | |

This modification to section 7.3.5.1 of HEVC WD 8 may, in accordance with one or more techniques of this disclosure, implement the removal of the delta_poc_msb_present_flag[i] syntax element and the modification of the delta_poc_msb_cycle_lt syntax element to cover all cases.

In section 7.4.5.1 of HEVC WD 8, the slice header semantics may be modified as follows:

poc_lsb_[i] specifies the value of the least significant bits of the picture order count value of the i-th long-term reference picture that is included in the long-term reference picture set of the current picture. The length of the poc_lsb_lt[i] syntax element is log 2_max_pic_order_cnt_lsb_minus4+4 bits. For any values of j and k in the range of num_long_term_sps to num_long_term_sps+num_long_term_pics−1, inclusive, if j is less than k, poc_lsb_lt[j] shall not be less than poc_lsb_lt[k].

used_by_curr_pic_lt_flag[i] equal to 0 specifies that the i-th long-term reference picture included in the long-term reference picture set of the current picture is not used for reference by the current picture. For any value of j in the range of 0 to num_long_term_ref_pics_sps−1, inclusive, if poc_lsb_lt[i] equals lt_ref_pic_poc_lsb_sps[j], used_by_curr_pic_lt_flag[i] shall not equal used_by_curr_pic_lt_sps_flag[j].

The variables PocLsbLt[i] and UsedByCurrPicLt[i] are derived as follows.

If i is less than num_long_term_sps, PocLsbLt[i] is set equal to lt_ref_pic_poc_lsb_sps[lt_idx_sps[i]] and UsedByCurrPicLt[i] is set equal to used_by_curr_pic_lt_sps_flag[lt_idx_sps[i]].

Otherwise, PocLsbLt[i] is set equal to poc_lsb_lt[i] and UsedByCurrPicLt[i] is set equal to used_by_curr_pic_lt_flag[i].

[[delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present. delta_poc_msb_present_flag[i] shall be equal to 1 when there is more than one reference picture in the decoded picture buffer with the least significant bits of the picture order count value equal to poc_lsb_lt[i].]]

delta_poc_msb_cycle_lt_plus1[i] minus 1 is used to determine the value of the most significant bits of the picture order count value of the i-th long-term reference picture that is included in the long-term reference picture set of the current picture. delta_poc_msb_cycle_lt_plus[i] shall be greater than 0 when there is more than one reference picture in the decoded picture buffer, excluding those pictures that are signaled as short-term reference picture for the current picture, with picture order count modulo MaxPicOrderCntLsb equal to PocLsbLt[i].

NOTE—When the value of delta_poc_msb_cycle_lt_plus[i] is 0, the MSB cycle is considered not signaled for the i-th long-term reference picture.

The variable DeltaPocMSBCycleLt[i] is derived as follows.

if( i = = 0 || i = = num_long_term_sps || PocLsbLt[ i − 1 ] ! = PocLsbLt[ i ] )
  DeltaPocMSBCycleLt[ i ] = delta_poc_msb_cycle_lt_plus1[ i ] − 1
else                                                                  (7-33)
  DeltaPocMSBCycleLt[ i ] = delta_poc_msb_cycle_lt_plus1[ i ] − 1 + DeltaPocMSBCycleLt[ i − 1 ]

The value of DeltaPocMSBCycleLt[i]*MaxPicOrderCntLsb+pic_order_cnt_lsb−PocLsbLt[i] shall be in the range of 1 to $2^{24}$−1, inclusive. For i and j in the range of 0 to num_long_term_sps+num_long_term_pics−1, inclusive, if i is not equal to j and PocLsbLt[i] is equal to PocLsbLt[j], DeltaPocMSBCycleLt[i] shall not be equal to DeltaPocMSBCycleLt[j].

The modification to the semantics of the used_by_curr_pic_lt_flag[i] syntax element may, in accordance with one or more techniques of this disclosure, implement the restriction that a slice header shall not explicitly indicate an LTRP when an applicable SPS indicates an equivalent LTRP. Furthermore, the changes shown above to section 7.4.5.1 of HEVC Working Draft 8 remove the semantics of the delta_poc_msb_present_flag[i] syntax element, in accordance with one or more techniques of this disclosure. Furthermore, the changes shown above to section 7.4.5.1 of HEVC Working Draft 8 modify the semantics of the delta_poc_msb_cycle_lt syntax element in accordance with one or more techniques of this disclosure. In addition, the clause "excluding those pictures that are signaled as short-term reference picture for the current picture" in the semantics for the delta_poc_msb_cycle_lt_plus1 syntax element may be part of the implementation of techniques of this disclosure for restricting video encoder 20 from signaling the MSBs of an LTRP when there are n (where n>1) reference pictures in the DPB with the same LSB and n−1 of those reference pictures are signaled as STRPs and the n-th picture is signaled as an LTRP. Furthermore, the clause "for i and j in the range of 0 to num_long_term_sps+num_long_term_pics−1, inclusive, if i is not equal to j and PocLsbLt[i] is equal to PocLsbLt[j], DeltaPocMSBCycleLt[i] shall not be equal to DeltaPocMSBCycleLt[j]" may be part of the implementation of the techniques of this disclosure that mandate that each LTRP signaled in a slice header must refer to a distinct reference picture among all the LTRPs signaled in the slice header.

In alternative examples, the slice header semantics may be the same as those shown in the example above, except that the clause "for i and j in the range of 0 to num_long_term_sps+num_long term_pics−1, inclusive, if i is not equal to j and PocLsbLt[i] is equal to PocLsbLt[j], DeltaPocMSBCycleLt[i] shall not be equal to DeltaPocMSBCycleLt[j]." is omitted from the semantics of the delta_poc_msb_cycle_lt_plus1[i] syntax element.

In section 8.3.2 of HEVC Working Draft 8, the decoding process for a reference picture set may be modified as follows:

Five lists of picture order count values are constructed to derive the reference picture set; PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is an IDR picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

Otherwise, the following applies for derivation of the five lists of picture order count values and the numbers of entries.

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal +
        DeltaPocS0[ StRpsIdx ][ i ]
    else
        PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ] )               [[(A)]]
        PocStCurrAfter[ j++ ] = PicOrderCntVal + DeltaPocS1[ StRpsIdx ][ i
]
    else
        PocStFoll[ k++ ] = PicOrderCntVal + DeltaPocS1[ StRpsIdx ][ i ]
NumPocStCurrAfter = j
NumPocStFoll = k
(8-5)
for( i = 0, j = 0, k = 0; i < num_long_term_sps + num_long_term_pics;
i++ ) {
    pocLt = PocLsbLt[ i ]
    if( delta_poc_msb_[[present_flag]]cycle_lt_plus1[ i ] > 0 )    (A)
        pocLt += PicOrderCntVal − DeltaPocMSBCycleLt[ i ] *
MaxPicOrderCntLsb − pic_order_cnt_lsb
```

```
    if( UsedByCurrPicLt[ i ] ) {
        PocLtCurr[ j ] = pocLt
        CurrDeltaPocMsbPresentFlag[ j++ ] = (
delta_poc_msb_[[present_flag]]cycle_lt_plus1[ i ] > 0 )
    } else {
        PocLtFoll[ k ] = pocLt                                     [[(B)]]
        FollDeltaPocMsbPresentFlag[ k++ ] = (
delta_poc_msb_[[present_flag]]cycle_lt_plus1[ i ] > 0 )
    }
}
NumPocLtCurr = j
NumPocLtFoll = k
``` where PicOrderCntVal is the picture order count of the current picture as specified in subclause 8.3.1.

NOTE 2—A value of StRpsIdx in the range from 0 to num_short_term_ref_pic_sets−1, inclusive, indicates that a short-term reference picture set from the active sequence parameter set is being used, where StRpsIdx is the index of the short-term reference picture set to the list of short-term reference picture sets in the order in which they are signaled in the sequenceparameter set. StRpsIdx equal to num_short_term_ref_pic_sets indicates that a short-term reference picture set explicitly signaled in the slice header is being used.

[[For each i in the range of 0 to NumPocLtCurr−1, inclusive, when (B)

CurrDeltaPocMsbPresentFlag[i] is equal to 1, it is a requirement of bitstream conformance that the following conditions apply:]]

[[There shall be no j in the range of 0 to NumPocStCurrBefore−1, inclusive, for which PocLtCurr[i] is equal to PocStCurrBefore[j].

There shall be no j in the range of 0 to NumPocStCurrAfter−1, inclusive, for which PocLtCurr[i] is equal to PocStCurrAfter[j].

There shall be no j in the range of 0 to NumPocStFoll−1, inclusive, for which PocLtCurr[i] is equal to PocStFoll[j].

For each i in the range of 0 to NumPocLtFoll−1, inclusive, when FollDeltaPocMsbPresentFlag[i] is equal to 1, it is a requirement of bitstream conformance that the following conditions apply:

There shall be no j in the range of 0 to NumPocStCurrBefore−1, inclusive, for which PocLtFoll[i] is equal to PocStCurrBefore[j].

There shall be no j in the range of 0 to NumPocStCurrAfter−1, inclusive, for which PocLtFoll[i] is equal to PocStCurrAfter[j].

There shall be no j in the range of 0 to NumPocStFoll−1, inclusive, for which PocLtFoll[i] is equal to PocStFoll[j].

For each i in the range of 0 to NumPocLtCur−1, inclusive, when CurrDeltaPocMsbPresentFlag[i] is equal to 0, it is a requirement of bitstream conformance that the following conditions apply:

There shall be no j in the range of 0 to NumPocStCurrBefore−1, inclusive, for which PocLtCurr[i] is equal to (PocStCurrBefore[j] & (MaxPicOrderCntLsb−1)).

There shall be no j in the range of 0 to NumPocStCurrAfter−1, inclusive, for which PocLtCurr[i] is equal to (PocStCurrAfter[j] & (MaxPicOrderCntLsb−1)).

There shall be no j in the range of 0 to NumPocStFoll−1, inclusive, for which PocLtCurr[i] is equal to (PocStFoll[j] & (MaxPicOrderCntLsb−1)).

For each i in the range of 0 to NumPocLtFoll−1, inclusive, when FollDeltaPocMsbPresentFlag[i] is equal to 0, it is a requirement of bitstream conformance that the following conditions apply:]

[[There shall be no j in the range of 0 to NumPocSt-CurrBefore−1, inclusive, for which PocLtFoll[i] is equal to (PocStCurrBefore[j] & (MaxPicOrderCntLsb−1)).

There shall be no j in the range of 0 to NumPocStCurrAfter−1, inclusive, for which PocLtFoll[i] is equal to (PocStCurrAfter[j] & (MaxPicOrderCntLsb−1)).

There shall be no j in the range of 0 to NumPocStFoll−1, inclusive, for which PocLtFoll[i] is equal to (PocStFoll[j] & (MaxPicOrderCntLsb−1)).]]

The reference picture set consists of five lists of reference picture entries; RefPicSetStCurrBefore, RefPicSetStCurrAfter, RefPicSetStFoll, RefPicSetLtCurr and RefPicSetLtFoll. The variable NumPocTotalCurr is set equal to NumPocStCurrBefore+NumPocStCurrAfter+NumPocLtCurr.

It is a requirement of bitstream conformance that the following applies to the value of NumPocTotalCurr:

If the current picture is a BLA or CRA picture, the value of NumPocTotalCurr shall be equal to 0.

Otherwise, when the current picture contains a P or B slice, the value of NumPocTotalCurr shall not be equal to 0.

NOTE 3—RefPicSetStCurrBefore, RefPicSetStCurrAfter and RefPicSetLtCurr contains all reference pictures that may be used in inter prediction of the current picture and that may be used in inter prediction of one or more of the pictures following the current picture in decoding order. RefPicSetStFoll and RefPicSetLtFoll consists of all reference pictures that are not used in inter prediction of the current picture but may be used in inter prediction of one or more of the pictures following the current picture in decoding order.

The derivation process for the reference picture set and picture marking are performed according to the following ordered steps, where DPB refers to the decoded picture buffer as described in Annex C:

1. The following applies:

```
- for( i = 0; i < NumPocLtCurr; i++ )
   if( !CurrDeltaPocMsbPresentFlag[ i ] )
      if( there is a [[long-term]] reference picture picX in the DPB
         [[[Ed. (JB):
Should be made more precise. (GJS): Seems roughly OK to me.]]]
         with pic_order_cnt_lsb equal to PocLtCurr[ i ]
         and with PicOrderCntVal not in any of ,                                (C)
PocStCurrBefore[ ], PocStCurrAfter[ ], and PocStFoll[ ] )
         RefPicSetLtCurr[ i ] = picX
   [[ else if( there is a short-term reference picture picY in the DPB
         with pic_order_cnt_lsb equal to PocLtCurr[ i ] )
         RefPicSetLtCurr[ i ] = picY]]
   else
      RefPicSetLtCurr[ i ] = "no reference picture"
   else
      if( there is a [[long-term]] reference picture picX in the DPB
         with PicOrderCntVal equal to PocLtCurr[ i ] )
         RefPicSetLtCurr[ i ] = picX
   [[ else if( there is a short-term reference picture picY in the DPB
         with PicOrderCntVal equal to PocLtCurr[ i ] )
         RefPicSetLtCurr[ i ] = picY]]
   else
      RefPicSetLtCurr[ i ] = "no reference picture"
for( i = 0; i < NumPocLtFoll; i++ )
   if( !FollDeltaPocMsbPresentFlag[ i ] )
      if( there is a [[long-term]] reference picture picX in the DPB
         with pic_order_cnt_lsb equal to PocLtFoll[ i ]
         and with PicOrderCntVal not in any of PocStCurrBefore[ ],
PocStCurrAfter[ ], and PocStFoll[ ] )
         RefPicSetLtFoll[ i ] = picX
   [[ else if( there is a short-term reference picture picY in the DPB
         with pic_order_cnt_lsb equal to PocLtFoll[ i ] )
         RefPicSetLtFoll[ i ] = picY]]
   else
      RefPicSetLtFoll[ i ] = "no reference picture"
   else
      if( there is a [[long-term]] reference picture picX in the DPB with
PicOrderCntVal to PocLtFoll[ i ] )
         RefPicSetLtFoll[ i ] = picX
      [[ else if( there is a short-term reference picture picY in the DPB
         with PicOrderCntVal equal to PocLtFoll[ i ] )
         RefPicSetLtFoll[ i ] = picY]]
   else
      RefPicSetLtFoll[ i ] = "no reference picture"
```

2. All reference pictures included in RefPicSetLtCurr and RefPicSetLtFoll are marked as "used for long-term reference", and the following constraints apply.

For each i in the range of 0 to NumPocLtCur−1, inclusive, it is a (D) requirement of bitstream conformance that the following conditions apply:

There shall be no j in the range of 0 to NumPocStCurrBefore−1, inclusive, for which PicOrderCntVal of RefPicSetLtCurr[i] is equal to PocStCurrBefore[j].

There shall be no j in the range of 0 to NumPocStCurrAfter−1, inclusive, for which PicOrderCntVal of RefPicSetLtCurr[i] is equal to PocStCurrAfter[j].

There shall be no j in the range of 0 to NumPocStFoll−1, inclusive, for which PicOrderCntVal of RefPicSetLtCurr[i] is equal to PocStFoll[j].

For each i in the range of 0 to NumPocLtFoll−1, inclusive, when RefPicSetLtFoll[i] is not equal to "no reference picture", it is a requirement of bitstream conformance that the following conditions apply:

There shall be no j in the range of 0 to NumPocStCurrBefore−1, inclusive, for which PicOrderCntVal of RefPicSetLtFoll[i] is equal to PocStCurrBefore[j].

There shall be no j in the range of 0 to NumPocStCurrAfter−1, inclusive, for which PicOrderCntVal of RefPicSetLtFoll[i] is equal to PocStCurrAfter[j].

There shall be no j in the range of 0 to NumPocStFoll−1, inclusive, for which PicOrderCntVal of RefPicSetLtFoll[i] is equal to PocStFoll[j].

3. The following applies:

```
- for( i = 0; i < NumPocStCurrBefore; i++ )
   if( there is a short-term reference picture picX in the DPB
      with PicOrderCntVal equal to PocStCurrBefore[ i ])
      RefPicSetStCurrBefore[ i ] = picX
   else
      RefPicSetStCurrBefore[ i ] = "no reference picture"
- for( i = 0; i < NumPocStCurrAfter; i++ )
   if( there is a short-term reference picture picX in the DPB
      with PicOrderCntVal equal to PocStCurrAfter[ i ])
      RefPicSetStCurrAfter[ i ] = picX
   else
      RefPicSetStCurrAfter[ i ] = "no reference picture"
(8-7)
for( i = 0; i < NumPocStFoll; i++ )                                 [[(F)]]
```

-continued

```
if( there is a short-term reference picture picX in the DPB
    with PicOrderCntVal equal to PocStFoll[ i ])
        RefPicSetStFoll[ i ] = picX
    else
        RefPicSetStFoll[ i ] = "no reference picture"
```

4. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".

NOTE 4—There may be one or more entries in the reference picture set equal to "no reference picture" because the corresponding pictures are not present in the decoded picture buffer. Entries in RefPicSetStFoll or RefPicSetLtFoll that are equal to "no reference picture" should be ignored. An unintentional picture loss should be inferred for each entry in RefPicSetStCurrBefore, RefPicSetStCurrAfter or RefPicSetLtCurr that is equal to "no reference picture".

It is a requirement of bitstream conformance that the reference picture set is restricted as follows:

There shall be no entry in RefPicSetStCurrBefore, RefPicSetStCurrAfter or RefPicSetLtCurr for which one or more of the following are true.

The entry is equal to "no reference picture".

The entry is a picture that has nal_unit_type equal to TRAIL_N, TSA_N or STSA_N and TemporalId equal to that of the current picture.

The entry is a picture that has TemporalId greater than that of the current picture.

When the current picture is a TSA picture, there shall be no picture included in the reference picture set with TemporalId equal to or greater than that of the current picture.

When the current picture is an STSA picture, there shall be no picture included in RefPicSetStCurrBefore, RefPicSetStCurrAfter or RefPicSetLtCurr that has TemporalId equal to that of the current picture.

When the current picture is a picture that follows, in decoding order, an STSA picture that has TemporalId equal to that of the current picture, there shall be no picture that has TemporalId equal to that of the current picture included in RefPicSetStCurrBefore, RefPicSetStCurrAfter or RefPicSetLtCurr that precedes the STSA picture in decoding order.

When the current picture is a CRA picture, there shall be no picture included in the reference picture set that precedes, in decoding order, any preceding RAP picture in decoding order (when present).

When the current picture is a trailing picture, there shall be no picture in RefPicSetStCurrBefore, RefPicSetStCurrAfter or RefPicSetLtCurr that was generated by the decoding process for generating unavailable reference pictures as specified in subclause 8.3.3.

When the current picture is a trailing picture, there shall be no picture in the reference picture set that precedes the associated RAP picture in output order or decoding order.

When the current picture is a DLP picture, there shall be no picture included in RefPicSetStCurrBefore, RefPicSetStCurrAfter or RefPicSetLtCurr that is any of the following types of pictures.

A TFD picture.

A picture that was generated by the decoding process for generating unavailable reference pictures as specified in subclause 8.3.3.

A picture that precedes the associated RAP picture in decoding order.

When the sps_temporal_id_nesting_flag is equal to 1, the following applies. Let tIdA be the value of TemporalId of the current picture picA. Any picture picB with TemporalId equal to tIdB that is less than or equal to tIdA shall not be included in RefPicSetStCurrBefore, RefPicSetStCurrAfter or RefPicSetLtCurr of picA when there exists a picture picC with TemporalId equal to tIdC that is less than tIdB, which follows the picture picB in decoding order and precedes the picture picA in decoding order.

NOTE 5—A picture cannot be included in more than one of the five reference picture set lists.

For any two different values of idxA and idxB in the range of 0 to num_short_term_ref_pic_sets, inclusive, one or more of the following shall be true.

NumNegativePics[idxA] is not equal to NumNegativePics[idxB].

NumPositivePics[idxA] is not equal to NumPositivePics[idxB].

When NumNegativePics[idxA] and NumPositivePics[idxA] equal NumNegativePics[idxB] and NumPositivePics[idxB], respectively, there exists either an i in the range of 0 to NumNegativePics[idxB]−1, inclusive, for which UsedByCurrPicS0[idxA][i] is not equal to UsedByCurrPicS0[idxB][i] or DeltaPocS0[idxA][i] is not equal to DeltaPocS0[idxB][i], or there exists a j in the range of 0 to NumPositivePics[idxB]−1, inclusive, for which UsedByCurrPicS1[idxA][j] is not equal to UsedByCurrPicS1[idxB][j] or DeltaPocS1[idxA][j] is not equal to DeltaPocS1[idxB][j], or both such i and j.

NOTE—No two short-term reference picture set candidates signaled in the sequence parameter set can be identical, and a short-term reference picture set pattern cannot be explicitly signaled in the slice header if an identical candidate is present in the candidate list in the sequence parameter set.

Alternatively, the following condition is added to reference picture setderivation process.

For each i in the range of 0 to NumPocLtFoll−1, inclusive, when RefPicSetLtFoll[i] (F) is not equal to "no reference picture", it is a requirement of bitstream conformance that there shall be no j in the range of 0 to NumPocLtCurr−1, inclusive, for which PicOrderCntVal of RefPicSetLtFoll[i] is equal to PicOrderCntVal of RefPicSetLtCurr[j].

The modification labeled (A) in section 8.3.2 of HEVC Working Draft 8 may be part of the implementation of the techniques of this disclosure for removing the delta_poc_msb_present_flag[i] syntax element and modifying the delta_poc_msb_cycle_lt[i] syntax element to cover all possible cases (i.e., both the case where MSBs of a POC value are signaled and where MSBs of a POC value are not signaled). The modifications labeled (B), (C), (D), and (F) may be part of the implementation of the techniques of this disclosure for restricting video encoder 20 from signaling the MSBs of an LTRP when there are n (where n>1) reference pictures in the DPB with the same LSBs and n−1 of those reference pictures are signaled as STRPs and the n-th picture is signaled as an LTRP.

The modification labeled (E) above may be part of the implementation of the techniques of this disclosure for restricting video encoder 20 such that no two STRP candidates that are signaled in the SPS are identical, and a STRPS pattern shall not be explicitly signaled in the slice header if an identical pattern is signaled among the short-term RPS candidates in the SPS.

In some examples, element 2 in the decoding process for a reference picture set shown above may be replaced with the following:

2. All reference pictures included in RefPicSetLtCurr and RefPicSetLtFoll are marked as "used for long-term reference", and the following constraints apply.

For each i in the range of 0 to NumPocLtCurr−1, inclusive, it is a requirement of bitstream conformance that the following conditions apply:

There shall be no j in the range of 0 to NumPocStCurrBefore−1, inclusive, for which PicOrderCntVal of RefPicSetLtCurr[i] is equal to PocStCurrBefore[j].

There shall be no j in the range of 0 to NumPocStCurrAfter−1, inclusive, for which PicOrderCntVal of RefPicSetLtCurr[i] is equal to PocStCurrAfter[j].

There shall be no j in the range of 0 to NumPocStFoll−1, inclusive, for which PicOrderCntVal of RefPicSetLtCurr[i] is equal to PocStFoll[j].

There shall be no j in the range of 0 to NumPocLtCurr−1, inclusive, where j is not equal to i, for which PicOrderCntVal of RefPicSetLtCurr[i] is equal to PicOrderCntVal of RefPicSetLtCurr[i].

For each i in the range of 0 to NumPocLtFoll−1, inclusive, when RefPicSetLtFoll[i] is not equal to "no reference picture," it is a requirement of bitstream conformance that the following conditions apply:

There shall be no j in the range of 0 to NumPocStCurrBefore−1, inclusive, for which PicOrderCntVal of RefPicSetLtFoll[i] is equal to PocStCurrBefore[j].

There shall be no j in the range of 0 to NumPocStCurrAfter−1, inclusive, for which PicOrderCntVal of RefPicSetLtFoll[i] is equal to PocStCurrAfter[j].

There shall be no j in the range of 0 to NumPocStFoll−1, inclusive, for which PicOrderCntVal of RefPicSetLtFoll[i] is equal to PocStFoll[j].

There shall be no j in the range of 0 to NumPocLtCurr−1, inclusive, for which PicOrderCntVal of RefPicSetLtFoll[i] is equal to PicOrderCntVal of RefPicSetLtCurr[j].

There shall be no j in the range of 0 to NumPocLtFoll−1, inclusive, where j is not equal to i and RefPicSetLtFoll[j] is not equal to "no reference picture", for which PicOrderCntVal of RefPicSetLtFoll[i] is equal to PicOrderCntVal of RefPicSetLtFoll[j].

The clauses shown in bold underline above are clauses that are not in the example decoding process for reference picture sets shown above. The clauses shown in bold underline above may mandate that each LTRP that is signaled (explicitly or indexed) in the slice header must refer to a distinct reference picture among all the LTRPs that are signaled (explicitly or indexed) in the slice header.

In an alternative example, the clause "For each i in the range of 0 to NumPocLtFoll−1, inclusive, when RefPicSetLtFoll[i] is not equal to 'no reference picture,' it is a requirement of bitstream conformance that there shall be no j in the range of 0 to NumPocLtCurr−1, inclusive, for which PicOrderCntVal of RefPicSetLtFoll[i] is equal to PicOrderCntVal of RefPicSetLtCurr[j]" may be omitted from the example above and replaced by the following:

Alternatively, in the derivation of DeltaPocMSBCycleLt[i] in Eqn 7-33, "delta_poc_msb_cycle_lt_plus1[i]−1" is replaced with "Max(0, delta_poc_msb_cycle_lt_plus1[i]−1). The resultant derivation of DeltaPocMSBCycleLt[i] is given below.

The variable DeltaPocMSBCycleLt[i] is derived as follows.

```
if( i == 0 || i == num_long_term_sps || PocLsbLt[ i − 1 ] !=
PocLsbLt[ i ] )
    DeltaPocMSBCycleLt[ i ] =
    Max( 0, delta_poc_msb_cycle_lt_plus1[ i ] − 1 )
else                                                      (7-33)
    DeltaPocMSBCycleLt[ i ] =
            Max( 0, delta_poc_msb_cycle_lt_plus1[ i ] − 1 ) +
            DeltaPocMSBCycleLt[ i − 1 ]
```

The example method of determining DeltaPocMSBCycleLt[i] may be part of the implementation of removing the delta_poc_msb_present_flag[i] syntax element and modifying the delta_poc_msb_cycle_lt[i] syntax element to cover all possible cases (i.e., both the case where MSBs of a POC value are signaled and where MSBs of a POC value are not signaled).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   obtaining, from a bitstream that includes encoded video data, a slice header of a current slice of a current picture of the video data, wherein:
      a set of reference pictures for the current picture consists of the following reference picture subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs);
      a set of one or more LTRP entries is received in the slice header,
      each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and
      the slice header is in compliance with a restriction that prohibits the slice header from signaling two LTRP entries referring to the same reference picture;
   storing one or more of the reference pictures in a decoded picture buffer, the one or more reference pictures comprising video blocks;
   performing, based on the video blocks of the one or more reference pictures stored in the decoded picture buffer, prediction of the video data.

2. The method of claim 1, wherein:
   the method further comprises obtaining, from the bitstream, a sequence parameter set (SPS) that is applicable to the current picture, the SPS including a particular LTRP entry that refers to a particular reference picture, the particular LTRP entry being in the set of one or more LTRP entries; and
   the particular LTRP entry is signaled in the slice header by the slice header including an index to the particular LTRP entry.

3. The method of claim 2, wherein the particular LTRP entry is a first LTRP entry and the slice header includes a second LTRP entry only if the second LTRP entry does not indicate that the particular reference picture is in a long-term reference picture set of the current picture.

4. The method of claim 2, wherein:
   the particular LTRP entry is a first LTRP entry,
   the SPS includes the first LTRP entry and a second LTRP entry; and
   the slice header includes an index to the second LTRP entry only if the second LTRP entry does not indicate that the particular reference picture is in a long-term reference picture set of the current picture.

5. The method of claim 2, wherein the SPS is in compliance with a restriction that prohibits the SPS from including two or more copies of the same LTRP entry.

6. The method of claim 2, wherein the slice header is in compliance with a restriction that prohibits the slice header from including two indexes to a single LTRP entry in the SPS.

7. The method of claim 2, wherein, for each respective LTRP entry in the SPS, the slice header does not include an LTRP entry matching the respective LTRP entry in the SPS.

8. The method of claim 2, wherein the particular LTRP entry is a first LTRP entry and the slice header is in compliance with a restriction that prohibits the slice header from including a second LTRP entry if the slice header includes an index to an equivalent LTRP entry in the SPS, wherein the second LTRP entry includes a least-significant bits (LSB) syntax element and a usage syntax element, and the equivalent LTRP entry includes a LSB syntax element that matches the LSB syntax element of the second LTRP entry and the equivalent LTRP entry includes a usage syntax element that matches the usage syntax element of the second LTRP entry, wherein the LSB syntax element of the second LTRP entry and the LSB syntax element of the equivalent LTRP entry indicate LSBs of picture order count (POC) values, and wherein the usage syntax element of the second LTRP entry and the usage syntax element of the equivalent LTRP entry indicate whether reference pictures are used for reference by the current picture.

9. The method of claim 1, wherein the slice header includes a first LTRP entry indicating that a particular reference picture is in a long term reference picture set of the current picture and includes a second LTRP entry only if the second LTRP entry does not indicate that the particular reference picture is in the long-term reference picture set of the current picture.

10. The method of claim 1, wherein the slice header is in compliance with a restriction that prohibits the slice header from including two LTRP entries that indicate reference pictures having the same POC value.

11. The method of claim 1, wherein the slice header is in compliance with a restriction that prohibits the RefPicSetLt- Curr from including two reference pictures with the same POC value, a restriction that prohibits the RefPicSetLtFoll from including two reference pictures with the same POC value, and a restriction that prohibits the RefPicSetLtCurr and the RefPicSetLtFoll from including reference pictures with the same POC value.

12. A video decoding device comprising:
a decoded picture buffer; and
one or more processors configured to:
  obtain, from a bitstream, a slice header of a current slice of a current picture of video data, wherein:
    a set of reference pictures for the current picture consists of the following reference picture subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs);
    a set of one or more LTRP entries is received in the slice header,
    each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and
    the slice header is in compliance with a restriction that prohibits the slice header from signaling two LTRP entries referring to the same reference picture;
  store one or more of the reference pictures in the decoded picture buffer, the one or more reference pictures comprising video blocks;
  perform, based on the video blocks of the one or more references pictures stored in the decoded picture buffer, prediction of the video data.

13. The video decoding device of claim 12, wherein:
the one or more processors are further configured to obtain, from the bitstream, a sequence parameter set (SPS) that is applicable to the current picture, the SPS including a particular LTRP entry that refers to a particular reference picture, the particular LTRP entry being in the set of one or more LTRP entries; and
the particular LTRP entry is signaled in the slice header by the slice header including an index to the particular LTRP entry.

14. The video decoding device of claim 13, wherein the particular LTRP entry is a first LTRP entry and the slice header includes a second LTRP entry only if the second LTRP entry does not indicate that the particular reference picture is in a long-term reference picture set of the current picture.

15. The video decoding device of claim 13, wherein:
the particular LTRP entry is a first LTRP entry,
the SPS includes the first LTRP entry and a second LTRP entry; and
the slice header includes an index to the second LTRP entry only if the second LTRP entry does not indicate that the particular reference picture is in a long-term reference picture set of the current picture.

16. The video decoding device of claim 13, wherein the SPS is in compliance with a restriction that prohibits the SPS from including two or more copies of the same LTRP entry.

17. The video decoding device of claim 13, wherein the slice header is in compliance with a restriction that prohibits the slice header from including two indexes to a single LTRP entry in the SPS.

18. The video decoding device of claim 13, wherein, for each respective LTRP entry in the SPS, the slice header does not include an LTRP entry matching the respective LTRP entry in the SPS.

19. The video decoding device of claim 13, wherein the particular LTRP entry is a first LTRP entry and the slice header is in compliance with a restriction that prohibits the slice header from including a second LTRP entry if the slice header includes an index to an equivalent LTRP entry in the SPS, wherein the second LTRP entry includes a least-significant bits (LSB) syntax element and a usage syntax element, and the equivalent LTRP entry includes a LSB syntax element that matches the LSB syntax element of the second LTRP entry and the equivalent LTRP entry includes a usage syntax element that matches the usage syntax element of the second LTRP entry, wherein the LSB syntax element of the second LTRP entry and the LSB syntax element of the equivalent LTRP entry indicate LSBs of picture order count (POC) values, wherein the usage syntax element of the second LTRP entry and the usage syntax element of the equivalent LTRP entry indicate whether reference pictures are used for reference by the current picture.

20. The video decoding device of claim 12, wherein the slice header includes a first LTRP entry indicating that a particular reference picture is in a long term reference picture set of the current picture and includes a second LTRP entry only if the second LTRP entry does not indicate that the particular reference picture is in the long-term reference picture set of the current picture.

21. The video decoding device of claim 12, wherein the slice header is in compliance with a restriction that prohibits the slice header from including two LTRP entries that indicate reference pictures having the same POC value.

22. The video decoding device of claim 12, wherein the slice header is in compliance with a restriction that prohibits the RefPicSetLtCurr from including two reference pictures with the same POC value, a restriction that prohibits the RefPicSetLtFoll from including two reference pictures with the same POC value, and a restriction that prohibits the RefPicSetLtCurr and the RefPicSetLtFoll from including reference pictures with the same POC value.

23. The video decoding device of claim 12, wherein the video decoding device comprises at least one of:
an integrated circuit;
a microprocessor; or
a wireless communication device.

24. The video decoding device of claim 12, further comprising a display configured to display decoded video data.

25. A video decoding device comprising:
means for obtaining, from a bitstream, a slice header of a current slice of a current picture of video data, wherein:
  a set of reference pictures for the current picture consists of the following reference picture subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs);
  a set of one or more LTRP entries is received in the slice header, each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and the slice header is in compliance with a restriction that prohibits the slice header from signaling two LTRP entries referring to the same reference picture;

means for storing one or more of the reference pictures in a decoded picture buffer, the one or more reference pictures comprising video blocks;

means for performing, based on the video blocks of the one or more reference pictures stored in the decoded picture buffer, prediction of the video data.

26. A non-transitory computer-readable storage medium having instructions stored thereon that, when executed by a video decoding device, configure the video decoding device to:

obtain, from a bitstream, a slice header of a current slice of a current picture, wherein:

a set of reference pictures for the current picture consists of the following reference picture subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs);

a set of one or more LTRP entries is signaled in the slice header, each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and the slice header is in compliance with a restriction that prohibits the slice header from signaling two LTRP entries referring to the same reference picture;

store one or more of the reference pictures in a decoded picture buffer, the one or more reference pictures comprising video blocks;

perform, based on the video blocks of the one or more reference pictures stored in the decoded picture buffer, prediction of the video data.

27. A method of encoding video data, the method comprising:

encoding video data, wherein:

a set of reference pictures for a current picture of the video data consists of the following reference pictures subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs), encoding the video data comprises signaling, in a slice header for a current slice of the current picture, a set of one or more long-term reference picture (LTRP) entries, each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and the slice header is in compliance with a restriction that prohibits the slice header from signaling two LTRP entries referring to the same reference picture; and outputting the encoded video data.

28. The method of claim 27, wherein:

the method further comprises generating a sequence parameter set (SPS) that is applicable to the current picture, the SPS including a particular LTRP entry that refers to a particular reference picture, the particular LTRP entry being in the set of one or more LTRP entries; and signaling the set of one or more LTRP entries in the slice header comprises including, in the slice header, an index to the particular LTRP entry.

29. The method of claim 28, wherein the particular LTRP entry is a first LTRP entry and the slice header includes a second LTRP entry only if the second LTRP entry does not indicate that the particular reference picture is in a long-term reference picture set of the current picture.

30. The method of claim 28, wherein:

the particular LTRP entry is a first LTRP entry, the SPS includes the first LTRP entry and a second LTRP entry; and signaling the set of one or more LTRP entries in the slice header comprises including, in the slice header, an index to the second LTRP entry only if the second LTRP entry does not indicate that the particular reference picture is in a long-term reference picture set of the current picture.

31. The method of claim 28, wherein generating the SPS comprises generating the SPS such that the SPS includes the particular LTRP entry only if the SPS does not already include a copy of the particular LTRP entry.

32. The method of claim 28, wherein generating the SPS comprises generating the SPS such that the SPS is in compliance with a restriction that prohibits the SPS from including two or more copies of the same LTRP entry.

33. The method of claim 28, wherein, for each respective LTRP entry in the SPS, the slice header includes an index to the respective LTRP entry only if the slice header does not already include a copy of the index to the respective LTRP entry.

34. The method of claim 28, wherein the slice header is in compliance with a restriction that prohibits the slice header from including two indexes to a single LTRP entry in the SPS.

35. The method of claim 28, wherein, for each respective LTRP entry in the SPS, the slice header does not include an LTRP entry matching the respective LTRP entry in the SPS.

36. The method of claim 28, wherein the particular LTRP entry is a first LTRP entry and the slice header is in compliance with a restriction that prohibits the slice header from including a second LTRP entry if the slice header includes an index to an equivalent LTRP entry in the SPS, wherein the second LTRP entry includes a least-significant bits (LSB) syntax element and a usage syntax element, and the equivalent LTRP entry includes a LSB syntax element that matches the LSB syntax element of the second LTRP entry and the equivalent LTRP entry includes a usage syntax element that matches the usage syntax element of the second LTRP entry, wherein the LSB syntax element of the second LTRP entry and the LSB syntax element of the equivalent LTRP entry indicate LSBs of picture order count (POC)

values, and wherein the usage syntax element of the second LTRP entry and the usage syntax element of the equivalent LTRP entry indicate whether reference pictures are used for reference by the current picture.

37. The method of claim 27, wherein signaling the set of one or more LTRP entries comprises:
signaling, in the slice header, a first LTRP entry indicating that a particular reference picture is in a long term reference picture set of the current picture; and
signaling, in the slice header, a second LTRP entry only if the second LTRP entry does not indicate that the particular reference picture is in the long-term reference picture set of the current picture.

38. The method of claim 27, wherein the slice header is in compliance with a restriction that prohibits the slice header from including two LTRP entries that indicate reference pictures having the same POC value.

39. The method of claim 27, wherein the slice header is in compliance with a restriction that prohibits the RefPicSetLtCurr from including two reference pictures with the same POC value, a restriction that prohibits the RefPicSetLtFoll from including two reference pictures with the same POC value, and a restriction that prohibits the RefPicSetLtCurr and the RefPicSetLtFoll from including reference pictures with the same POC value.

40. A video encoding device comprising:
one or more processors configured to:
encode video data, wherein:
a set of reference pictures for a current picture of the video data consists of the following reference picture subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs),
as part of encoding the video data, the one or more processors signal, in a slice header for a current slice of the current picture, a set of one or more long-term reference picture (LTRP) entries,
each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and
the slice header is in compliance with a restriction that prohibits the slice header from signaling two LTRP entries referring to the same reference picture; and
an output interface configured to output the encoded video data.

41. The video encoding device of claim 40, wherein the one or more processors are configured to:
generate a sequence parameter set (SPS) that is applicable to the current picture, the SPS including a particular LTRP entry that refers to a particular reference picture, the particular LTRP entry being in the set of one or more LTRP entries; and
signal the set of one or more LTRP entries in the slice header in part by including, in the slice header, an index to the particular LTRP entry.

42. The video encoding device of claim 41, wherein particular LTRP entry is a first LTRP entry and the slice header includes a second LTRP entry only if the second LTRP entry does not indicate that the particular reference picture is in a long-term reference picture set of the current picture.

43. The video encoding device of claim 41, wherein:
the particular LTRP entry is a first LTRP entry,
the SPS includes the first LTRP entry and a second LTRP entry; and
the one or more processors are configured to include, in the slice header, an index to the second LTRP entry only if the second LTRP entry does not indicate that the particular reference picture is in a long-term reference picture set of the current picture.

44. The video encoding device of claim 41, wherein the one or more processors are configured to generate the SPS such that the SPS includes the particular LTRP entry only if the SPS does not already include a copy of the particular LTRP entry.

45. The video encoding device of claim 41, wherein the one or more processors are configured to generate the SPS such that the SPS is in compliance with a restriction that prohibits the SPS from including two or more copies of the same LTRP entry.

46. The video encoding device of claim 41, wherein, for each respective LTRP entry in the SPS, the slice header includes an index to the respective LTRP entry only if the slice header does not already include a copy of the index to the respective LTRP entry.

47. The video encoding device of claim 41, wherein the one or more processors are configured to generate the slice header such that the slice header is in compliance with a restriction that prohibits the slice header from including two indexes to a single LTRP entry in the SPS.

48. The video encoding device of claim 41, wherein, for each respective LTRP entry in the SPS, the slice header does not include an LTRP entry matching the respective LTRP entry in the SPS.

49. The video encoding device of claim 41, wherein the particular LTRP entry is a first LTRP entry and the one or more processors are configured to generate the slice header such that the slice header is in compliance with a restriction that prohibits the slice header from including a second LTRP entry if the slice header includes an index to an equivalent LTRP entry in the SPS, wherein the second LTRP entry includes a least-significant bits (LSB) syntax element and a usage syntax element, and the equivalent LTRP entry includes a LSB syntax element that matches the LSB syntax element of the second LTRP entry and the equivalent LTRP entry includes a usage syntax element that matches the usage syntax element of the second LTRP entry, wherein the LSB syntax element of the second LTRP entry and the LSB syntax element of the equivalent LTRP entry indicate LSBs of picture order count (POC) values, wherein the usage syntax element of the second LTRP entry and the usage syntax element of the equivalent LTRP entry indicate whether reference pictures are used for reference by the current picture.

50. The video encoding device of claim 40, wherein the one or more processors are configured to:
signal, in the slice header, a first LTRP entry indicating that a particular reference picture is in a long term reference picture set of the current picture; and
signal, in the slice header, a second LTRP entry only if the second LTRP entry does not indicate that the particular reference picture is in the long-term reference picture set of the current picture.

51. The video encoding device of claim 40, wherein the one or more processors are configured to generate the slice header such that the slice header is in compliance with a restriction that prohibits the slice header from including two LTRP entries that indicate reference pictures having the same POC value.

52. The video encoding device of claim 40, wherein the slice header is in compliance with a restriction that prohibits the RefPicSetLtCurr from including two reference pictures with the same POC value, a restriction that prohibits the RefPicSetLtFoll from including two reference pictures with the same POC value, and a restriction that prohibits the RefPicSetLtCurr and the RefPicSetLtFoll from including reference pictures with the same POC value.

53. A video encoding device comprising:
   means for encoding video data, wherein:
      a set of reference pictures for a current picture of the video data consists of the following reference pictures subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs),
      the means for encoding the video data comprises means for signaling, in a slice header for a current slice of the current picture, a set of one or more long-term reference picture (LTRP) entries,
      each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and
      the slice header is in compliance with a restriction that prohibits the slice header from signaling two LTRP entries referring to the same reference picture; and
   means for outputting the encoded video data.

54. A non-transitory computer-readable storage medium having instructions stored thereon that, when executed by a video encoding device, configure the video encoding device to:
   encode video data, wherein:
      a set of reference pictures for a current picture of the video data consists of the following reference pictures subsets: RefPicSetStCurrBefore, RefPicSetStCurrAfter, RefPicSetStFoll, RefPicSetLtCurr and RefPicSetLtFoll, reference pictures in RefPicSetLtCurr and RefPicSetLtFoll being long term reference pictures (LTRPs),
      as part of configuring the video encoding device to encode the video data, the instructions configure the video encoding device to signal, in a slice header for a current slice of the current picture, a set of one or more long-term reference picture (LTRP) entries,
      each respective LTRP entry of the set of one or more LTRP entries is a tuple consisting of a first syntax element and a second syntax element, the first syntax element indicating least significant bits of a Picture Order Count (POC) value of a respective LTRP of the LTRPs, the second syntax element indicating whether the respective LTRP is used for reference by the current picture, and
      the slice header is in compliance with a restriction that prohibits the slice header from signaling two LTRP entries referring to the same reference picture; and
   output the encoded video data.

* * * * *